United States Patent [19]
Chung et al.

[11] Patent Number: 6,015,862
[45] Date of Patent: Jan. 18, 2000

[54] FUNCTIONALIZED α-OLEFIN/PARA-ALKYLSTYRENE TERPOLYMERS

[75] Inventors: Tze-Chiang Chung, State College, Pa.; Honglan Lu, Port Lavaca, Tex.

[73] Assignee: The Penn State Research Foundation, University Park, Pa.

[21] Appl. No.: 09/178,308

[22] Filed: Oct. 23, 1998

Related U.S. Application Data

[63] Continuation-in-part of application No. 08/671,990, Jun. 28, 1996, Pat. No. 5,866,659, which is a continuation-in-part of application No. 08/341,778, Nov. 18, 1994, Pat. No. 5,543,484.

[51] Int. Cl.[7] .................................. C08F 257/02
[52] U.S. Cl. .......................... 525/320; 525/279; 525/296; 525/309; 525/313; 525/322; 525/324; 525/333.4; 525/333.5; 525/333.6; 525/350; 525/359.1; 525/359.2; 525/360; 525/379; 525/384; 525/386; 526/347
[58] Field of Search ..................... 526/347, 296, 526/320, 322, 324; 525/279, 267, 268, 309, 311, 313, 333.3, 333.4, 333.5, 333.6, 350, 359.1, 359.2, 360, 379, 384, 386

[56] References Cited

U.S. PATENT DOCUMENTS

| | | | |
|---|---|---|---|
| 3,506,627 | 4/1970 | Zaim | 526/347 X |
| 4,230,836 | 10/1980 | Canterino | 525/333.3 X |
| 5,026,798 | 6/1991 | Canich | 526/127 |
| 5,162,445 | 11/1992 | Powers et al. | 525/333.3 X |
| 5,169,818 | 12/1992 | Antberg et al. | 502/159 |
| 5,244,996 | 9/1993 | Kawasaki et al. | 526/347 |
| 5,362,824 | 11/1994 | Furtek et al. | 526/114 |
| 5,378,672 | 1/1995 | Shamshoum et al. | 502/108 |
| 5,432,242 | 7/1995 | Baron | 526/68 |
| 5,498,673 | 3/1996 | Patil | 525/333.3 |
| 5,703,187 | 12/1997 | Timmers | 526/282 |
| 5,866,659 | 2/1999 | Chung et al. | 525/279 |

FOREIGN PATENT DOCUMENTS 903094969  3/1990  European Pat. Off. .

OTHER PUBLICATIONS

"Synthesis of Poly(ethylene–co–p–methylstyrene) Copolymers by Metallocene Catalysts with Constrained Ligand Geometry", By T. C. Chung, et al., 1997, *Journal of Polym. Sci. A: Polym. Chem.*

Primary Examiner—Fred Teskin
Attorney, Agent, or Firm—Thomas J. Monahan

[57] ABSTRACT

Functionalized terpolymers of two different α-olefin and para-alkylstyrene are disclosed, wherein the functionalized terpolymers have a substantially homogeneous compositional distribution represented by the formula:

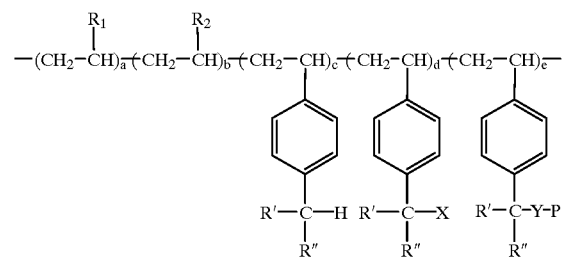

in which $R_1$, $R_2$, R' and R" independently, are hydrogen or a primary or secondary alkyl group; X is a functional group, such as —COOH, —OH, —SH, —NH$_2$, —Cl, —Br, —M, —COOM (M =metals, e.g. Li, Na, K and Ca) and anhydrides; P is a polymer having a molecular weight of at least 500; Y is chemical linkage between polymer P and para-alkystyrene side chain; and the combination of a+b+c+d+e represents the empirical formula of a substantially random functional polymer; where both a and b are greater than 0; where the sum of a+b ranges from about 50 to 100,000; where each of c, d and e range from 0 to 10,000; where both d and e can not be 0; and where the sum of c+d+e is at least 1.

25 Claims, 4 Drawing Sheets

FUNCTIONALIZED α-OLEFIN/PARA-ALKYLSTYRENE TERPOLYMERS

RELATED APPLICATION

This application is a continuation-in-part of Ser. No. 08/671,990, filed Jun. 28, 1996, now U.S. Pat. No. 5,866,659, which, in turn, is a continuation-in-part of Ser. No. 08/341,778, filed Nov. 18, 1994, now U.S. Pat. No. 5,543,484.

FIELD OF THE INVENTION

The present invention relates to functionalized terpolymers of α-olefin and para-alkylstyrene. The formula of functionalized terpolymer is shown below:

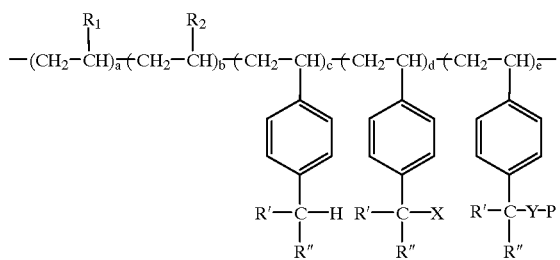

in which $R_1$, $R_2$, R' and R" independently, are hydrogen or a primary or secondary alkyl group, with the proviso that $R_1$ is not the same as $R_2$; X is a functional group, such as —COOH, —OH, —SH, —$NH_2$, —Cl, —Br, —M, —COOM (M=metals, e.g. Li, Na, K and Ca) and carboxylic acid anhydrides such as succinic anhydride; P is a polymer having the molecular weight of at least about 500, which can be derived from both step and chain polymerization reactions; Y is a chemical linkage between polymer P and para-alkystyrene side chain, which is also a residue derived from a graft reaction; and the combination of a+b+c+d+e represents the empirical formula of a substantially random functional polymer; where both a and b are greater than 0; where the sum of a+b ranges from about 50 to 100,000; where each of c, d and e range from 0 to 10,000; and the sum of c+d+e is at least 1, with the proviso that both d and e can not be 0.

Preferably, $R_1$ is hydrogen and $R_2$ is $C_1$ to $C_{10}$ linear or branched alkyl group, and most preferably $R_1$ is hydrogen and $R_2$ is a linear or branched $C_1$ to $C_6$ alkyl group. Preferably, R' and R" are hydrogen or $C_1$ to $C_6$ linear or branched alkyl group, and most preferably R' and R" are hydrogen. In the above formula, residues derived from a graft reaction include a simple chemical bond or a functional group, such as an ether, ester, amide or an imide group.

Also disclosed are functionalization processes, including both graft-onto and graft-from reactions, for producing functionalized copolymers of α-olefin and p-alkylstyrene with functional groups located along the polyolefin backbone or concentrated in the side chain segments.

BACKGROUND OF THE INVENTION

The copolymerization of styrene and α-olefins is usually very difficult in the direct copolymerization processes using Ziegler-Natta catalysts (see Seppala etal. Macromolecules 27, 3136, 1994 and Soga et al. Macromolecules, 22, 2875, 1989). Especially involving stereospecific heterogeneous catalysts, the reactivity of monomer is sterically controlled, the larger the size the lower the reactivity. Only very few % of styrene has been randomly incorporated in polyethylene (HDPE) and isotactic polypropylene (i-PP) in the batch reactions. By using several low reactive metal oxide catalysts and under very inconvenient "living" polymerization conditions, the combination of Ziegler-Natta polymerization and transformation reactions were reported to produce some α-olefin/styrene diblock copolymers (see Doi et al. "Coordination Polymerization", edited by Price and Vandenberg, Plenum Press, 1983 and Akiki et al. JP 04,130,114).

On the other hand, the copolymerization of styrene (styrene derivatives) and isobutylene with cationic catalysts is known in the art (see Harris et al. U.S. Pat. No. 4,145,190 and Macromolecules, 19, 2903, 1986). Under cationic polymerization conditions, p-alkylstyrene and isobutylene have been copolymerized rather readily to yield the copolymers covering the entire compositional range. Thus, such copolymers ranging from tough, glassy high poly(p-alkylstyrene) content copolymers for use in plastic blends, to rubbery p-alkylstyrene incorporated isobutylene copolymers. Furthermore, the copolymers have been used in a variety of applications, including use as adhesives in connection with other materials taking advantage of the surface characteristics of the polyisobutylene sequences, as coatings, as asphalt blends, and in various plastic blends.

The interest of incorporating p-alkylstyrene in polymer is due to its versatility to access a broad range of functional groups. The benzylic protons are ready for many chemical reactions which introduce functional groups at benzylic position under mild reaction conditions. The oxidation of alkylbenzene to carboxylic acids has been widely studied (see Onopchenkov et al. J. Org. Chem. 37, 1414, 1972 and Stover et al. Macromolecules, 24, 6340, 1991). The halogenation of benzylic systems is also a well-established chemistry (see Ford et al. Macromolecules, 19, 2470, 1986; Salvadori et al. Macromolecules, 20, 58, 1987; Jones et al. Polymer, 31, 1519, 1990). Some reports have also shown the effective metallation reactions to form benzylic anion in alkylbenzene species (see Makromol. Chem., Rapid Commun. 7, 437, 1986 and Roggero et al. Polymer International, 30, 93, 1993). In addition, the further conversion of the halogenated and metallated products significantly broaden the scope of functional groups in polymers to almost all the desirable organic functional groups. The benzylic halogen functionality constitutes a very active electrophile that can be converted to many other functionalities via nucleophilic substitution reactions. This functionalization route has long been recognized and the chemical literature is replete with examples of these reactions. "Clean" conversions in high yield to many functionalities, including the following have been reported: aldehyde carboxy, amide, ether, ester, thioester, thioether, alkoxy, cyanomethyl, hydroxymethyl, thiomethyl, aminomethyl, cationic ionomers (guaternary ammonium or phosphonium, s-isothiouronium, or sufonium salts), anionic ionomers (sulfonate and carboxylate salts), etc. In addition, the literature describes many examples in which a benzylic halogen is replaced by a cluster of other functionalities by nucleophilic substitution with a multifunctional nucleophile such as: triethanol amine, ethylene polyamines, malonates, etc. Nearly all of this previous work has been with simple, small (i.e. non-polymeric) molecules containing the aromatic halomethyl (or benzylic) functionality. However, a considerable amount of art also exists on nucleophilic substitution reactions involving chloromethyl styrene and polystyrenes containing aromatic chloromethyl groups to introduce other functionalities. Much of this work involves reactions with "styragels", or lightly cross-linked polystyrenes containing various amounts of benzylic chlorine (see Camps et al. Macromol. Chem. Physics, C22(3), 343, 1982–83, Montheard, et al. Rev. Macromol. Chem. Phys., C-38, 503, 1988 and JMJ Frechet in "Crown Ethers and Phase Transfer Catalysts in Polymer Science", edited by Matthews and Canecher and Published by Plenum Press, NY, 1984).

It is well-known that most of polyolefins are produced by coordination polymerization using transition metal catalysts, commonly known as Ziegler-Natta catalysts (see J. Boor, Jr., Ziegler-Natta Catalysts and Polymerizations; Academic Press: New York, 1979). In recent years, the new developments in metallocene homogeneous catalysts (see Kaminsky et al. U.S. Pat. No. 4,542,199, Ewen et al. U.S. Pat. No. 4,530,914, Slaugh et al. U.S. Pat. No. 4,665,047, Turner U.S. Pat. No. 4,752,597, Canich et al. U.S. Pat. No. 5,026,798 and Lai et al. U.S. Pat. No. 5,272,236) provide a new era in polyolefin synthesis. With well-defined (single-site) catalyst, the monomer insertion can be effectively controlled. The reaction is especially important for the copolymerization reactions. Several prior art disclosures have shown the use of metallocene catalysts with constrained ligand geometry producing linear low density polyethylene (LLDPE) with narrow composition distribution and narrow molecular weight distribution. The relatively opened active site in metallocene catalyst provides the equal excesses for both comonomers. The incorporation of high olefin comonomer is significantly higher than those obtained from traditional Ziegler-Natta catalysts. In addition, the prior art has identified the cationic coordination mechanism responsible for the polymerization reaction in the single site catalysts. Both cationic active site insertion mechanism and effective copolymerization of comonomers are very important and favorable for the incorporation of para-alkylstyrene in polyolefins.

Although useful in many commercial applications, polyolefins, such as high density polyethylene (HDPE) and isotactic polypropylene (i-PP), suffer a major deficiency, poor interaction with other materials. The inert nature of polyolefins significantly limits their end uses, particularly, those in which adhesion, dyeability, paintability, printability or compatibility with other functional polymers is paramount. Unfortunately, polyolefins have been the most difficult materials in chemical modifications, both in functionalization and graft reactions. In the post-polymerization, the inert nature and crystallinity of the polymer usually cause the material very difficult to be chemically modified under mild reaction conditions. In many cases, the reaction involves serious side reactions, such as degradation in the polypropylene modification reaction. In the direct polymerization, only a Ziegler-Natta process can be used in the preparation of linear polyolefins. It is normally difficult to incorporate the functional group-containing monomers into the polyolefins by Ziegler-Natta catalysts due to the catalyst poisons (see J. Boor, Jr., Ziegler-Natta Catalysts and Polymerizations; Academic Press: New York, 1979). Our previous inventions (see Chung et al. U.S. Pat. Nos. 4,734,472; 4,751,276; 4,812,529; 4,877,846) have taught the uses of borane-containing polyolefins. The chemistry involves the direct polymerization by using organoborane-substituted monomers and α-olefins in Ziegler-Natta processes. The homo- and copolymers containing borane groups are very useful intermediates to prepare a series of functionalized polyolefins. Many new functionalized polyolefins with various molecular architectures have been obtained based on this chemistry. In addition, it has been demonstrated that the polar groups can improve the adhesion of polyolefin to many substrates, such as metals and glass (see Chung et al, J. Thermoplastic Composite Materials 6, 18, 1993 and Polymer, 35, 2980, 1994). The chemistry of borane containing polymers has also been extended to the preparation of polyolefin graft copolymers, which involves free radical graft-from reaction (see Chung et al, U.S. Pat. No. 5,286,800, 1994). In polymer blends, the incompatible polymers can be improved by adding a suitable polyolefin graft copolymer which reduces the domain sizes and increases the interfacial interaction between domains (see Chung et al, Macromolecules 26, 3467, 1993; Macromolecules, 27, 1313, 1994).

SUMMARY OF THE INVENTION

Figure 1:
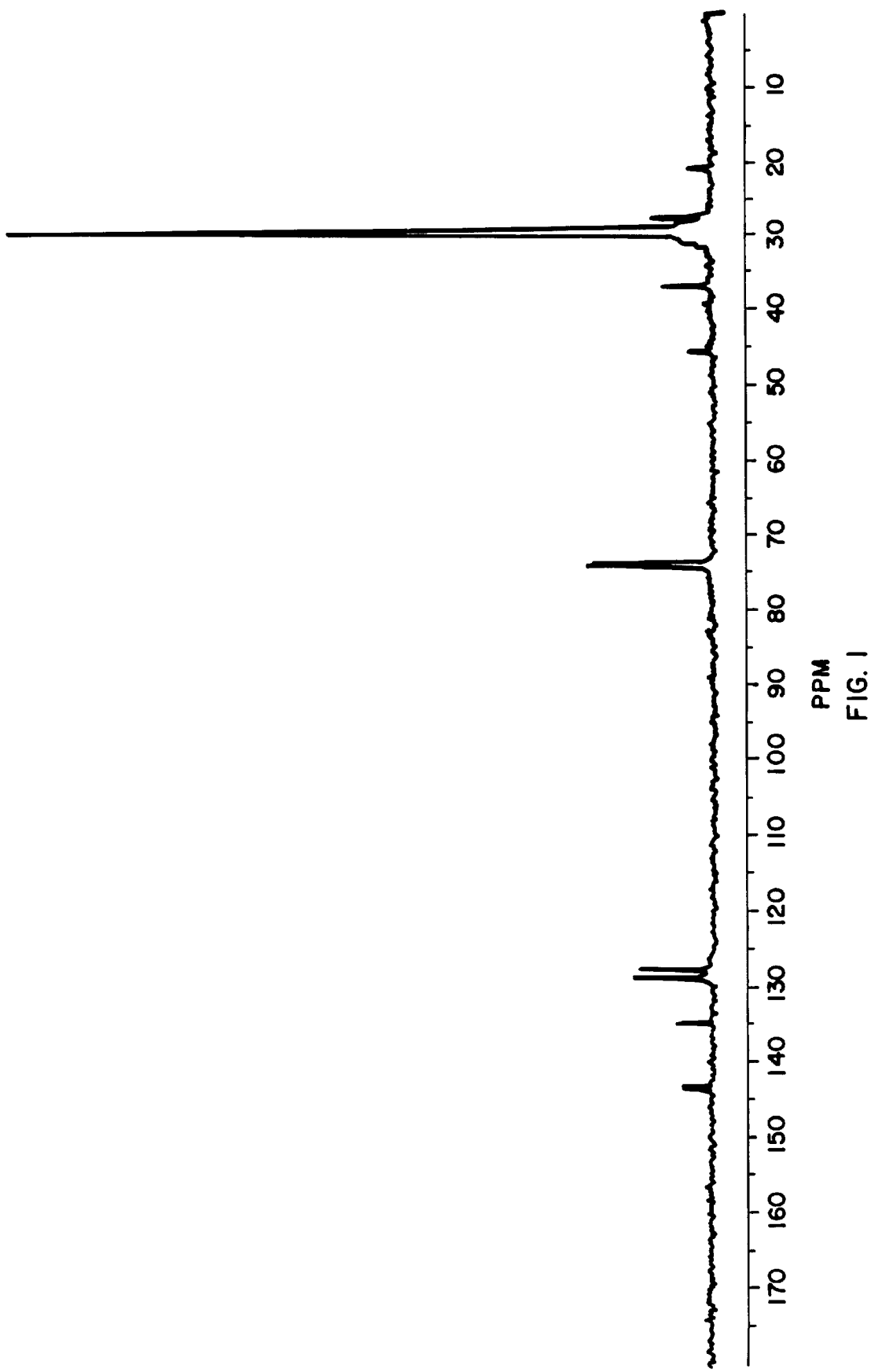
FIG. 1 is a $^{13}$C NMR spectra of poly(ethylene-co-p-methylstyrene)

In accordance with the present invention applicants have discovered a class of terpolymers which are well suited for conversion to functional polymers. The terpolymers comprise the direct reaction product of two different α-olefins having from 2 to 12 carbon atoms and p-alkylstyrene (para-alkylstyrene) and are characterized by a substantially homogeneous compositional distribution. The terpolymers may be illustrated by the following formula:

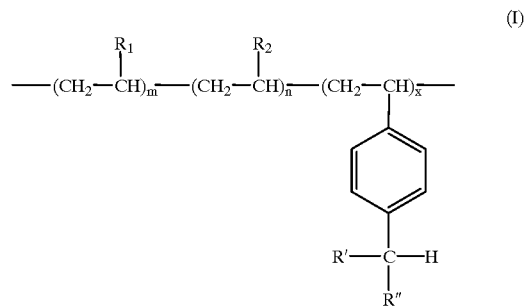

in which $R_1$, $R_2$, R' and R" are, independently, either hydrogen, or a linear or branched alkyl group and in which $R_1$ and $R_2$ are different. Preferably, $R_1$ is hydrogen and $R_2$ is $C_1$ to $C_{10}$ linear and branched alkyl, and most preferably $R_1$ is hydrogen and $R_2$ is $C_1$ to $C_6$ alkyl. Preferably, R' and R" are hydrogen or $C_1$ to $C_6$ linear or branched alkyl, and most preferably R' and R" are hydrogen. In the terpolymer composition, the combined α-olefin mole % (m+n) is between about 5 and 99.9. Preferably, m+n is between 85 and 99.9, and most preferably m+n is between 95 and 99.9. Both m and n are greater than 0. The sum of m, n and x (mole % of para-alkylstyrene) is 100. The terpolymer has a number average molecular weight (Mn) of at least about 1,000, and preferably at least about 10,000. The terpolymers also preferably have a ratio of weight average molecular weight (Mw) to number average molecular weight, or Mw/Mn of less than about 8, more preferably less than about 4, most preferably less than about 2.5.

In accordance with another aspect of the present invention, applicants have also discovered a process for producing a terpolymer (I) of α-olefins having from 2 to 12 carbon atoms and para-alkylstyrene in which the terpolymer has a substantially homogeneous compositional distribution. The catalysts preferly empolyed in the production are single-site metallocene catalysts, which have a constrained ligand geometry and a relatively opened active sites available for the insertion of both α-olefins and p-alkylstyrene monomer. In addition, the cationic nature of active site provides favorable condition of the insertion of p-alkylstyrene. In fact, the reactivity of p-methylstyrene is significantly higher than that of styrene. Preferred catalyst complexes include zirconocene and titanocene compounds with single or double cyclopentadienyl derivatives which form the constrained ligand geometry. The catalyst further comprises an activating cocatalyst which usually is a Bronsted acid salt with noncoordinating anion. By mixing the α-olefins and p-alkylstyrene monomers in a reactor with the presence of a diluent and metallocene catalyst, the terpolymerization was taken place under the inert atmosphere conditions. The terpolymerization can be terminated when desired by the addition of a conventional terminating agent, sometimes referred to as a reaction "killer", such as water, isopropanol or methanol (MeOH) to destroy the active metal species. Other suitable reaction killers are disclosed, for example, in Baron, U.S. Pat. No. 5,432,242, the discloure of which is incorporate herein by reference. These terpolymers can be isolated from solution by any conventional means known in the art. For example, the terpolymers can be isolated by simple filtration and washing repeatedly with an alcohol such as MeOH or isopropanol.

In accordance with another embodiment of the present invention, applicants have also discovered a functionalized copolymers of α-olefin having from 2 to 12 carbon atoms and para-alkylstyrene. The formula of functionalized copolyer is shown below:

Preferably, R' and R" are hydrogen or $C_1$ to $C_6$ linear or branched alkyl, and most preferably R' and R" are hydrogen. In the above formula, residues derived from a graft reaction include a simple chemical bond or a functional group, such as an ether, ester, amide or an imide group.

DETAILED DESCRIPTION

This invention is initially based upon the discovery that the effective terpolymerization reaction of two different α-olefins and p-alkylstyrene under some transition metal catalyst conditions. Especially, the use of metallocene catalysts with constrained ligand geometry offers unexpectedly high comonomer reactivity. This type terpolymerization reaction now permits one to produce terpolymers which comprise the direct reaction product with uniform terpolymer compositional distributions and high comonomer incorporations. The terpolymer of two different α-olefins and p-alkylstyrene is very useful material by itself and is also an versatile intermediate compound for the interconvertion to functionalized polyolefins with various functional groups and functional group concentrations.

The terpolymers comprising the direct reaction product of two different α-olefins having from 2 to 12 carbon atoms and p-alkylstyrene in which the terpolymer has a substantially homogeneous compositional distribution. The terpolymer formula is illustrated below (II)

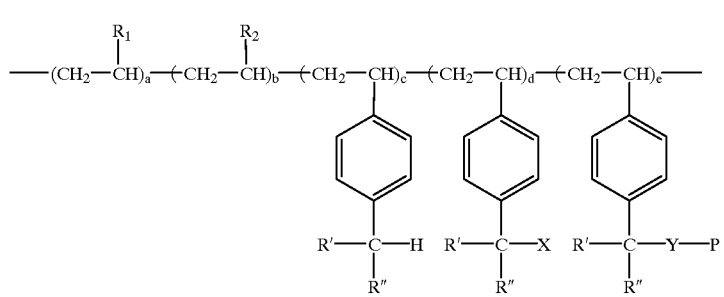

in which $R_1$, $R_2$, R' and R" independently, are hydrogen or a linear of branched alkyl group and in which $R_1$ is not the same as $R_2$; X is a functional group, such as —COOH, —OH, SH, —NH$_2$, —Cl, —Br, —M, —COOM (M=metals, e.g. Li, Na, K and Ca) and carboxylic acid anhydrides such as succinic anhydride; P is a polymer having the molecular weight of at least about 500, which can be derived from both step and chain polymerization reactions; Y is a chemical linkage between polymer P and para-alkystyrene side chain, which is also a residue derived from a graft reaction; and the combination of a+b+c+d+e represents the empirical formula of a substantially random functional polymer; where both a and b are greater than 0, where the sum of a+b ranges from about 50 to 100,000; where each of c, d and e range from 0 to 10,000; and the sum of c+d+e is at least 1, with the proviso that both d and e can not be 0.

Preferably, $R_1$ is hydrogen and $R_2$ is $C_1$ to $C_{10}$ linear or branched alkyl group, and most preferably $R_1$ is hydrogen and $R_2$ is a linear or branched $C_1$ to $C_6$ alkyl group.

(I)

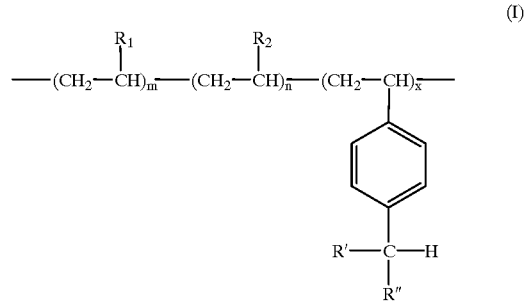

in which $R_1$, $R_2$, R' and R" are, independently, either hydrogen, or a linear or branched alkyl group and in which $R_1$ and $R_2$ are different. Preferably, $R_1$ is hydrogen and $R_2$ is $C_1$ to $C_{10}$ linear and branched alkyl, and most preferably $R_1$ is hydrogen and $R_2$ is $C_1$ to $C_6$ alkyl. Preferably, R' and R" are hydrogen or $C_1$ to $C_6$ linear or branched alkyl, and most preferably R' and R" are hydrogen. In the terpolymer composition, the combined α-olefin mole % (m+n) is between about 5 and 99.9. Preferably, m+n is between 85 and 99.9, and most preferably m+n is between 95 and 99.9. Both m and n are greater than 0. The sum of m, n and x (mole % of para-alkylstyrene) is 100. The terpolymer has a number average molecular weight (Mn) of at least about 1,000, and preferably at least about 10,000. The terpolymers also preferably have a ratio of weight average molecular weight (Mw) to number average molecular weight, or Mw/Mn of less than about 8, more preferably less than about 4, most preferably less than about 2.5.

The general process in producing α-olefin and p-alkylstyrene terpolymers is illustrated in equation 1.

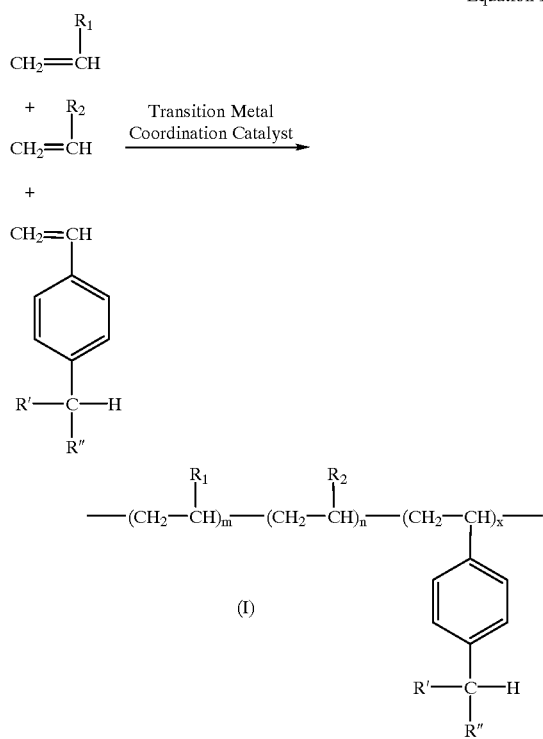

Equation 1 in which $R_1$, $R_2$, R' and R" are as defined above. In the terpolymer composition, the combined α-olefin mole % (m+n) is between about 5 and 99.9. Preferably, m+n is between 85 and 99.9, and most preferably m is between 95 and 99.9. Both m and n are greater than 0. The sum of m, n and x (mole % of p-alkylstyrene) is 100. The terpolymers have high molecular weights, and in particular have a number average molecular weight (Mn) of at least about 1,000, and preferably at least about 10,000.

As expected, the terpolymerization of two different α-olefins and p-alkylstyrene (such as p-methylstyrene) by using traditional Ziegler-Natta catalyst is not very effective. Only very low % of p-methylstyrene can be incorporated into polyolefin structures. Usually, the terpolymerization reaction was taken place by mixing the α-olefins and p-alkylstyrene in a reactor with the presence of a diluent and Ziegler-Natta catalyst under the inert atmosphere conditions.

On the other hand, α-olefins and p-alkylstyrene are readily terpolymerized with single-site metallocene catalysts. The cationic coordination terpolymerization of the p-alkylstyrene (especially p-methylstyrene) and two α-olefins (especially when one of the α-olefins is ethylene) is very effective in producing the products with a relatively narrow composition distribution and narrow molecular weight distribution. In particular, these terpolymers thus exhibit a ratio of weight average molecular weight (Mw) to number average molecular weight, or Mw/Mn value, of less than about 8, preferably less than about 4, more preferably less than about 2.5. The terpolymers have high molecular weights, and in particular having a number average molecular weight (Mn) of at least 1,000, and preferably at least about 10,000. The α-olefin mole % (m) is between about 5 and 99.9. Preferably, m is between 85 and 99.9, and most preferably m is between 95 and 99.9. The sum of m and n (mole % of p-alkylstyrene) is 100. The cationic nature of active site and constrained ligand geometry of metallocene catalyst provides favorable condition for the insertion of p-alkylstyrene. In fact, the reactivity of p-methylstyrene is significantly higher than that of styrene.

Suitable metallocene catalysts shall have a delocalized π-bonded moiety with a constrained geometry. The catalysts may be further described as a metal coordination complex comprising a metal of groups IVB–VIB of the Periodic Table of the elements and a delocalized π-bonded moiety with a constrained geometry, some of them have been taught in U.S. Pat. Nos. 4,542,199; 4,530,914; 4,665,047; 4,752,597; 5,026,798 and 5,272,236. Preferred catalyst complexes include zirconocene and titanocene coordination compounds with single or double cyclopentadienyl derivatives which form the constrained ligand geometry. The catalyst further comprises an activating cocatalyst which usually is a Bronsted acid salt with noncoordinating anion. The amount of such catalysts generally range from about 20 ppm to 1 wt. %, and preferably from about 0.001 to 0.2 wt. %, based upon the total amount of monomer to be polymerized therein.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane, etc.. The processes of the present invention can be carried out in the form of a slurry of polymer formed in the diluents employed, or as a homogeneous solution process.

In general, the polymerization reactions of the present invention are carried out by mixing p-methylstyrene and two different α-olefins (e.g., ethylene and and propylene or ethylene and 1-octene under constant pressure) in the presence of the catalyst and diluent in a polymerization reactor, with thorough mixing, and under terpolymerization conditions, including means to control reaction temperature between 0 to 85° C. In particular, the polymerization may be carried out under batch conditions, such as in an inert gas atmosphere and the substantial absence of moisture. Preferably the polymerization is carried out continuously in a typical continuous polymerization process with inlet pipes for monomers, catalysts and diluents, temperature sensing means and an effluent overflow to a holding drum or quench tank. The overall residence time can vary, depending upon, e.g., catalyst activity and concentration, monomer concentration, reaction temperature and monomer conversion, and generally will be between about thirty minutes and five hours, and preferably between about 1 and 2 hours.

One major advantage of the α-olefins and p-alkylstyrene terpolymers (I) is the versatility of benzylic protons in p-alkylstyrene unit which can be selectively converted to various functional groups under mild reaction conditions.

The general functionalized terpolymers of α-olefin and p-alkylstyrene is illustrated below, in which the terpolymer has a substantially homogeneous compositional distribution.

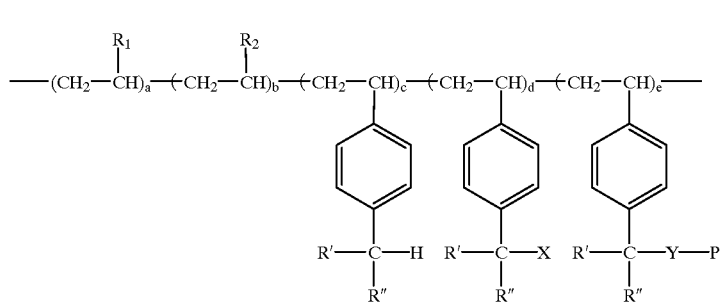

in which $R_1$, $R_2$, $R'$ and $R''$ independently, are hydrogen or a primary or secondary alkyl group, with the proviso that $R_1$ is not the same as $R_2$; X is a functional group, such as —COOH, —OH, —SH, —NH$_2$, —Cl, —Br, —M, —COOM (M=metals, e.g. Li, Na, K and Ca) and carboxylic acid anhydrides such as succinic anhydride; P is a polymer having the molecular weight of at least about 500, which can be derived from both step and chain polymerization reactions; Y is a chemical linkage between polymer P and para-alkystyrene side chain, which is also a residue derived from a graft reaction; and the combination of a+b+c+d+e represents the empirical formula of a substantially random functional polymer; where both a and b are greater than 0, where the sum of a+b ranges from about 50 to 100,000; where each of c, d and e range from 0 to 10,000; and the sum of c+d+e is at least 1, with the proviso that both d and e can not be 0.

Preferably, $R_1$ is hydrogen and $R_2$ is $C_1$ to $C_{10}$ linear or branched alkyl group, and most preferably $R_1$ is hydrogen and $R_2$ is a linear or branched $C_1$ to $C_6$ alkyl group. Preferably, $R'$ and $R''$ are hydrogen or $C_1$ to $C_6$ linear or branched alkyl, and most preferably $R'$ and $R''$ are hydrogen. In the above formula, residues derived from a graft reaction include a simple chemical bond or a functional group, such as an ether, ester, amide or an imide group.

In the above formula, the polymer segments P may be derived from anionically polymerizable monomers, free radically polymerized monomers, anionically and cationically ring-openable monomers or oxidatively coupleable monomers. Suitable anionically polymerizable monomers include, for example, vinyl aromatic compounds, such as styrene and alkyl-substituted styrenes, vinyl unsaturated amides, such as acrylamide and methacrylamide, vinyl unsaturated nitriles, such as acrylonitrile and methacrylonitrile, vinyl unsaturated esters, such as alkyl aceylates (e.g. methylacrylate) and alkyl methacrylate (e.g., methylmethacrylate), conjugated dienes, such as butadiene and isoprene, vinyl puridines and the like. Mixtures of such anionically polymerizable monomers also may be used.

Suitable free radically polymerizable monomers include, for example, olefins, such as ethylene, vinyl aromatic compounds, acrylates and methacrylates, vinyl esters, such as vinyl acetate, acrylamides and methacrylamides, acrylonitrile and methacrylonitrile. Mixtures of such compounds also may be used.

Suitable anionically and cationically ring-openable monomers include, for example, cyclic ethers, sulfides, lactones, lactams and n-carboxyanhydrides. Specific, non-limiting examples of such compounds include β-propiolactone, γ-butyrolactone, δ-valerolactone, glycolide, lactide, ε-caprolactone, β-propriolactam, γ-butyrolactam, ε-caprolactam, ethylene oxide, propylene oxide, epichlorohydrin, oxetane, tetrahydrofuran and octamethylcyclotetrasiloxane.

Suitable oxidatively coupleable monomers include, for example, dicarboxylic acids, diols, diamines, ω-aminoacids, diisocyanates, unsaturated acids, anhydrides and dianhydrides.

Specific, non-limiting examples of such compounds include terephthalic acid, dimethylterephthalate, adipic acid, p-hydrozybenzoic acid, dodecanedioic acid, isophthaloyl chloride, terephthaloyl chloride, ethylene glycol, poly (ethylene glycol), 1,4-butanediol, bisphenol A, epichlorhydrin, tolylene diisocyanate, hexamethylene diisocyanate, 4,4'-diaminophenyl ether, hexamethylene diamine, m-phenylene diamine, p-phenylene diamine, ω-aminoundecanoic acid, maleic anhydride, phthalic anhydride and pyromellitic dianhydride.

The chemical linkage Y is a residue from a graft reaction and may be a simple chemical bond or a residue of a linked nucleophile or functional group, such as an ether, ester, amide or imide group. Specific, non-limiting examples of Y include

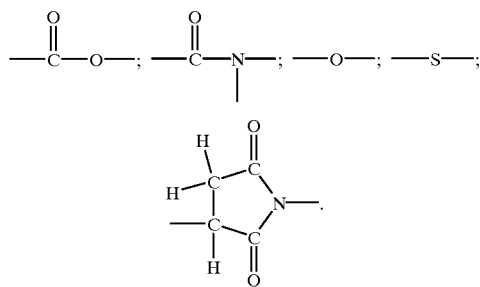

All functionality introducing reactions in α-olefin/p-alkylstyrene terpolymers are post-polymerization chemical modification processes which can be run on bulk recovered polymer, and can also be run on polymer solution (homogeneous or in a finely dispersed slurry) after suitable quenching and removal of residual monomers. Most functionalization reactions of benzylic protons in both organic compounds and poly(p-alkylstyrene) known in the prior art can be applied to α-olefin/p-alkylstyrene terpolymers with some modifications to enhance the mixing of reagents. Usually, bulk reactions can be effected in an extruder, or mixer, suitably modified to provide adequate mixing. Such bulk reactions have the advantage of permitting complete removal of residual unreacted p-methylstyrene by conventional finishing operations prior to chemical modification, and of avoiding possible diluent reactions which produce undesired side products. Solution processes are advantageous in that they permit good mixing and control of modification conditions to be achieved, as well as easier removal of undesired byproducts. Disadvantages of solution processes include the need for removal of residual unreacted para-methylstyrene prior to chemical modification reactions.

The following equation 2, involving (but not limited to) oxidation, halogenation and metallation reactions, is used to illustrated the functionalization reactions of benylic protons in the terpolymers of two different α-olefins and p-alkylstyrene.

great versatility of the benzylic halogen, makes this a most preferred modification reaction. The halogenation reaction can be carried out in the bulk phase or in solution (homogeneous or in a finely dispersed slurry) using bromine, N-bromosuccinimide, sodium hypochlorite or sodium hypobromite as typical halogenating agents. Bulk halogenation can be effected in an extruder, or mixer, suitably modified to provide adequate mixing. It has the advantages of permitting complete removal of residual unreacted p-methylstyrene by conventional finishing operations prior to halogenation, and of avoiding possible diluent halogenation as an undesired side reaction. Solution halogenation is advantageous in that it permits good mixing and

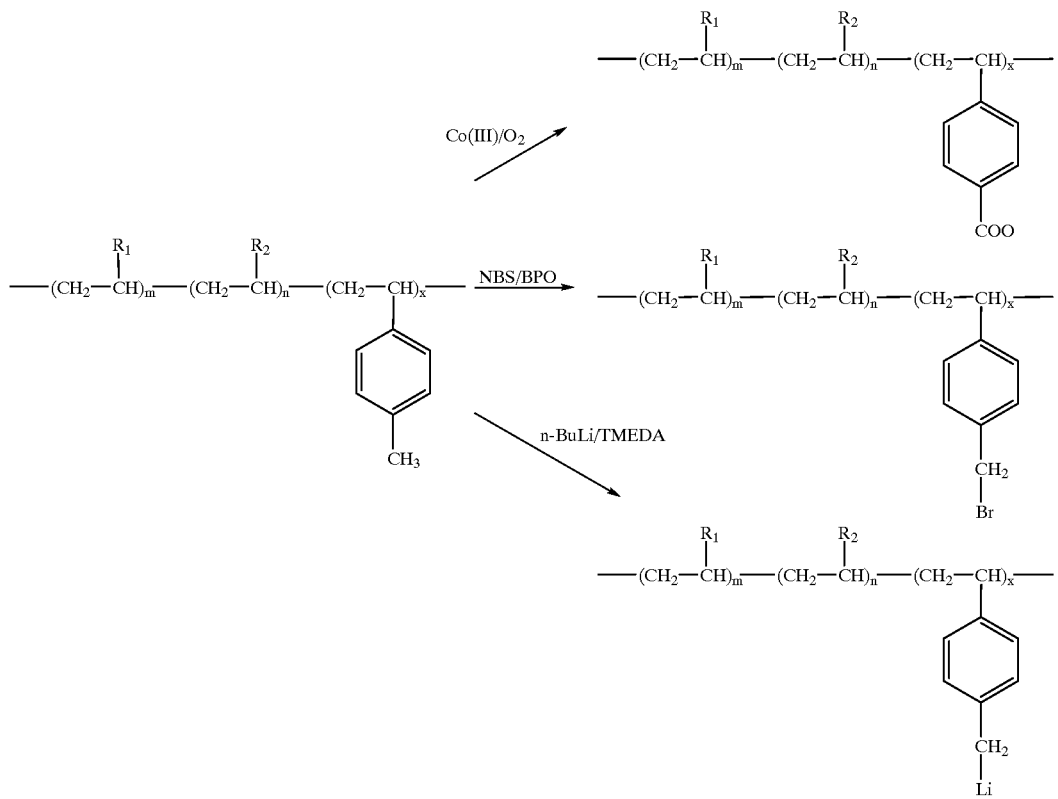

Equation 2

In the above equation 2, $R_1$ and $R_2$ are either hydrogen, or a linear or branched alkyl group, with the proviso that $R_1$ and $R_2$ are different. Preferably, $R_1$ is hydrogen and $R_2$ is $C_1$ to $C_{10}$ linear and branched alkyl, and most preferably $R_1$ is hydrogen and $R_2$ is $C_1$ to $C_6$ alkyl. The combined α-olefin mole % (m+n) is between about 5 and 99.9. Preferably, m+n is between 85 and 99.9, and most preferably m+n is between 95 and 99.9. Both m and n are greater than 0. The sum of m, n and x (mole % of para-alkylstyrene) is 100. The terpolymer has a number average molecular weight (Mn) of at least 1,000, and preferably at least about 10,000. The terpolymers also preferably have a ratio of weight average molecular weight (Mw) to number average molecular weight, or Mw/Mn of less than about 8, more preferably less than about 4, most preferably less than about 2.5.

An example of chemical modification reaction is halogenation (e.g., radical bromination) to produce the very versatile benzylic halogen-functional copolymers described herein. The surprising ease and highly selective nature of radical halogenation to introduce a benzylic halogen, and the control of halogenation conditions to be achieved, easier removal of undesired halogenation by-products, and a wider range of initiators of halogenation to be employed. Its disadvantages include the need for removal of residual unreacted p-methylstyrene prior to halogenation, the presence of complicating side reactions involving solvent halogenation, and a solution step if a non-solution polymerization process is used to prepare the terpolymer, as well as removal, clean-up and recycle of the solvent. Suitable solvents for such halogenation include the low boiling hydrocarbons ($C_4$ to $C_7$) and halogenated hydrocarbons.

It has rather surprisingly been found that radical halogenation, e.g., bromination, of the enchained paramethyl styryl moiety in the terpolymers of this invention can be made highly specific with almost exclusive substitution occurring on the para-methyl group, to yield the desired benzylic bromine functionality. The high specificity of the bromination reaction can thus be maintained over a broad range of reaction conditions, provided, however, the factors which would promote the ionic reaction route are avoided (i.e., polar diluents, Friedel-Crafts catalysts, etc.). Thus, solutions of the p-methylstyrene/α-olefin terpolymers of this invention in hydrocarbon solvents such as pentane, hexane or heptane can be selectively brominated using light, heat, or selected radical initiators (according to conditions, i.e., a particular radical initiator must be selected which has an appropriate half-life for the particular temperature conditions being utilized, with generally longer half-lives preferred at warmer halogenation temperatures) as promoters of radical halogenation, to yield almost exclusively the desired benzylic bromine functionality, via substitution on the para-methyl group, and without appreciable chain scisson. It is believed that he bromination reaction proceeds by means of a rapid radical chain reaction with the chain carrier being, alternatively, a bromine atom and a benzylic radical resulting from hydrogen atoms abstraction from a para-alkyl group on the enchained para-methyl styryl moiety. Since little tertiary benzylic bromine is produced in the terpolymer molecule, the potential dehydrohalogenation reaction will be almost entirely eliminated therein. In addition, presence of the bromine on the para-alkyl groups leads to several additional significant advantages with respect to this product. Firstly, it permits functionalization by substitution of other functional groups at that site. More particularly, the highly reactive nature of the halogen in the haloalkyl group attached to an aromatic ring makes it a particularly desirable functionality to extend the usefulness of these terpolymers in a range of applications. The presence of aromatic haloalkyl groups in the terpolymer permits cross-linking in a variety of ways under mild conditions.

The above-described functional polymers in equation 2 are susceptible to further reactions, including further polymerization. In other words, another type of functional polymer having graft copolymer structure can be easily prepared from the mixed α-olefin/p-alkylstyrene terpolymers under mild reaction conditions. Both graft-from and graft-onto reactions can be applied to produce polyolefin graft copolymers which have polyolefin backbone and several polymer chains (as the side chains) randomly bonded to the polyolefin backbone. Equation 3 shows two examples and illustrates both graft-onto and graft-from reaction schemes.

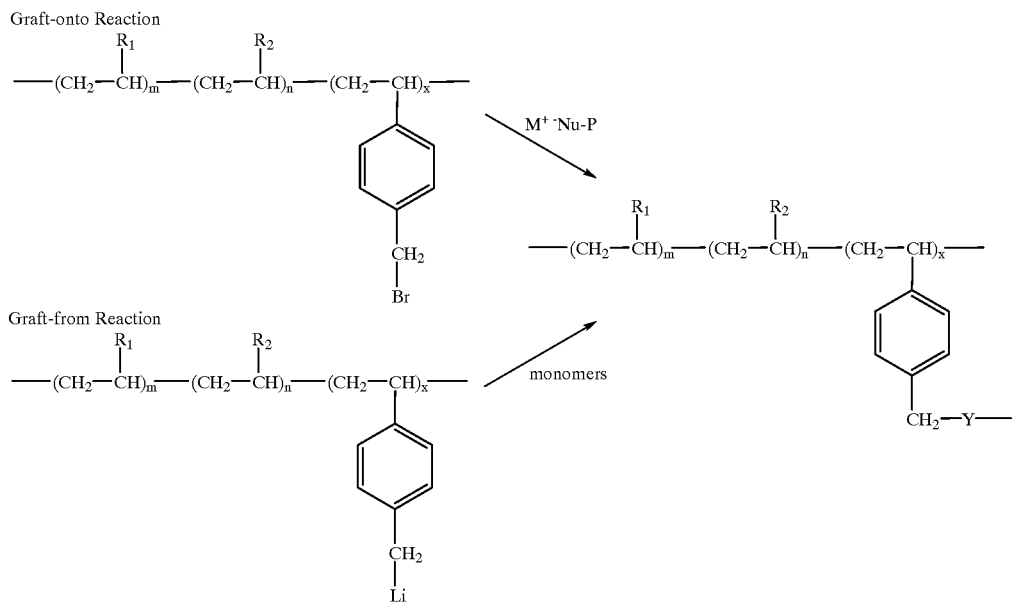

Equation 3 in which $R_1$ and $R_2$ are hydrogen, or a linear or branched alkyl group and in which $R_1$ and $R_2$ are different. Most preferably $R_1$ is hydrogen and $R_2$ is $C_1$ to $C_6$ alkyl. P comprises a polymer having the molecular weight of at least about 500, which can be derived from both step and chain polymerization reactions; M is a metal ion, such as an alkali or alkaline earth metal ion, or an onium ion, such as tetraalkylammonium; Nu is a nucleophilic functional group which can perform a well-known condensation reactions with benzylic halide; monomer represents a monomer which is susceptible to anionic polymerization such as, for example, vinyl aromatic compounds such as styrene and alkyl substituted styrene, acrylamides, alkyl acrylates and methacrylates, and conjugated dienes, such as isoprene and butadiene; Y is a chemical linkage between polymer P and para-alkystyrene side chain, which is the residue derived from graft reaction (the residue includes a simple chemical bond or a functional group, such as ether, ester, amide and imide functionalities); m and n (α-olefin mole %) are greater than 0 and m+n is between about 5 and 99.9 (preferably, m+n is between 85 and 99.9, and most preferably m+n is between 95 and 99.9); and the sum of m, n and x (mole % of para-alkylstyrene) is 100.

The examples which follow illustrate, but are in in way intended to limit, the invention.

EXAMPLE 1

Synthesis of Poly(ethylene-co-p-methylstyrene)

In an argon filled dry-box, 100 ml of toluene, 1.5 g (7.5 mmol in Al) methylaluminoxane (MAO) (30 wt % in toluene) and 2.10 g (17.4 mmol) p-methylstyrene were placed into a Parr 450 ml stainless autoclave equipped with a mechanical stirrer. The sealed reactor was then moved out from the dry box and purged with ethylene gas and the solution was saturated with 45 psi ethylene gas at 30° C., the catalyst solution of 2.09 mg (5.0 umol) of Et(Ind)$_2$ZrCl$_2$ in 2 ml of toluene was added under ethylene pressure to initiate the polymerization. Additional ethylene was fed continuously into the reactor to maintain a constant pressure of 45 psi during the whole course of the polymerization. After 60 min, the reaction was terminated by addition of 100 ml of dilute HCl solution in methanol (MeOH), the polymer was isolated by filtration, was washed completely with MeOH, and dired under vaccum at 50° C. for 8 hrs. About 3.85 g of coplymer with 1.67 mole % of p-methylstyrene (Tm=125.6° C., Mw=151,800 and Mw/Mn=2.41) was obtained.

EXAMPLES 2–9

Synthesis of Poly(ethylene-co-p-methylstyrene)

In a series of examples, high molecular weight of ethylene/p-methylstyrene copolymers were prepared by batch slurry polymerization in a Parr 450 ml stainless autoclave equipped with a mechanical stirrer. The similar reaction procedures described in Example 1 were carried out with the designed reaction conditions (catalyst, solvent, monomer feeds and reaction time and temperature) as indicated in Table I. In all copolymerization reactions, Et(Ind)$_2$ZrCl$_2$/MAO catalyst was used with 100 ml of solvent, either toluene or hexane. Various reaction temperature and time were examined to understand the effects to the catalyst activity and copolymer composition. The copolymerization reactions were terminated by adding 100 ml of dilute HCl solution in MeOH. The polymers were isolated by filtering and washed completely with MeOH and dired under vaccum at 50° C. for 8 hrs. The composition, molecular weight (with molecular weight distribution) of copolymer were determinated by high temperature $^1$H NMR and gel permeation chromatography (GPC), respectively. The crystallinity (Tm: melting point and H: heat of fusion) was measured by differential scanning calorimetry (DSC).

The results obtained are set forth in Table 1. In general, the incorporation of p-methylstyrene in polyethylene was very effective by using Et(Ind)$_2$ZrCl$_2$/MAO catalyst. More than 80 mole % p-methylstyrene convertion was achieved in 2 hours reaction time. The cationic nature of active site and constrained ligand geometry with opened space for comonomer insertion in Et(Ind)$_2$ZrCl$_2$ catalyst provides favorable condition for the insertion of p-alkylstyrene. In fact, the reactivity of p-methylstyrene is significantly higher than that of styrene (will be shown in Examples 10 and 11). From the comparison of homopolymerization of ethylene (control reaction) and copolymerization reactions of ethylene/p-methylstyrene (Examples 2–4), the copolymerization activity slightly increases with the increase of p-methylstyrene. It is unexpected to see the solvent effect which shows significant difference between hexane and toluene. Hexane solvent (Examples 7–9) seems provide higher catalyst activity and p-methylstyrene conversion. The relatively sharp and uniform GPC and DSC curves for all copolymers demonstrate narrow molecular weight distributions and substantially homogeneous compositional distributions or compositional uniformity over the entire range of compositions thereof.

TABLE 1

A summary of the copolymerization reactions between ethylene (E) (m$_1$) and para-methylstyrene(pMS) (m$_2$) with Et(Ind)$_2$ZrCl$_2$/MAO catalysts.

| Expt. No. | cat. µmol | solvent* ml | Tp ° C. | m$_1$/psi | m$_2$/10$^{-2}$ mol | tp min | Yield g | activity × 10$^{-5}$** | [M$_2$] mol % | conversion wt % | Tm ° C. | ΔH J/g | M$_w$ × 10$^{-3}$ | M$_w$/M$_n$ |
|---|---|---|---|---|---|---|---|---|---|---|---|---|---|---|
| control | 5.0 | T/100 | 30 | E/45 | 0 | 60 | 3.22 | 6.44 | 0 | / | 136.8 | 148.7 | 250.4 | 3.67 |
| 1 | 5.0 | T/100 | 30 | E/45 | pMS/1.74 | 60 | 3.85 | 7.70 | 1.67 | 12.5 | 125.6 | 112.7 | 151.8 | 2.41 |
| 2 | 5.0 | T/100 | 30 | E/45 | pMS/3.43 | 60 | 3.78 | 7.56 | 2.98 | 10.8 | 122.6 | 93.9 | 151.5 | 2.25 |
| 3 | 5.0 | T/100 | 30 | E/45 | pMS/6.82 | 60 | 4.39 | 8.78 | 7.04 | 13.1 | 120.0 | 84.0 | 137.6 | 2.14 |
| 4 | 12.5 | T/100 | 30 | E/45 | pMS/6.80 | 120 | 8.62 | 3.45 | 12.46 | 40.4 | 112.3 | 66.9 | 77.0 | 2.03 |
| 5 | 5.0 | T/100 | 50 | E/45 | pMS/3.43 | 60 | 4.48 | 8.96 | 4.28 | 17.5 | 121.6 | 102.1 | 100.0 | 2.47 |
| 6 | 17.0 | T/100 | 50 | E/14.5 | pmS/3.39 | 60 | 9.40 | 5.53 | 4.54 | 39.2 | 118.4 | 75.6 | — | — |
| 7 | 5.0 | H/100 | 30 | E/45 | pMS/3.39 | 60 | 5.58 | 11.20 | 1.65 | 9.21 | 116.1 | 81.9 | — | — |
| 8 | 17.0 | H/100 | 50 | E/45 | pMS/3.43 | 60 | 24.50 | 14.40 | 2.44 | 57.7 | 113.9 | 74.5 | 82.90 | 3.19 |
| 9 | 17.0 | H/100 | 50 | E/45 | pMS/3.39 | 120 | 31.00 | 9.12 | 2.76 | 82.8 | 113.8 | 71.5 | — | — |
| 10 | 5.0 | T/100 | 30 | E/45 | ST/6.82 | 60 | 3.39 | 6.78 | 0.91 | 1.75 | 123.8 | 100.5 | 80.80 | 2.45 |
| 11 | 17.0 | H/100 | 50 | E/45 | ST/3.51 | 60 | 20.42 | 12.01 | 2.20 | 43.1 | 116.5 | 87.5 | — | — |

*Solvents: T (toluene), H (n-hexane)
**g polmer/mol Zr.h

EXAMPLE 10

Synthesis of Poly(ethylene-co-styrene)

The similar reaction conditions described in Example 1 were carried out in the copolymerization reaction of ethylene and styrene. To a Parr 450 ml stainless autoclave equipped with a mechanical stirrer, 100 ml of toluene, 1.5 g (7.5 mmol in Al) methylaluminoxane (MAO) (30 wt % in toluene) and 7.2 g (68.2 mmol) of styrene were charged. The sealed reactor was then saturated with 45 psi ethylene gas at 30° C. before adding catalyst solution, 2.09 mg (5.0 umol) of Et(Ind)$_2$ZrCl$_2$ in 2 ml of toluene, to initiate the polymerization. Additional ethylene was fed continuously into the reactor by maintaining a constant pressure of 45 psi during the whole course of the polymerization. After 60 min, the reaction was terminated by adding 100 ml of dilute HCl solution in MeOH. The polymer was isolated by filtering and washed completely with MeOH and dired under vaccum at 50° C. for 8 hrs. About 3.39 g of poly(ethylene-co-styrene) with 0.91 mole % of styrene (Tm=123.8° C., Mw=80,800 and Mw/Mn=2.45) was obtained. The conversion of the styrene was only 1.75%, which is very low comparing with the p-methystyrene cases in the similar reaction conditions.

EXAMPLE 11

Synthesis of Poly(ethylene-co-styrene)

The similar reaction conditions described in Example 10 were carried out for the copolymerization reaction of ethylene and styrene, excepting 35.1 mmol of styrene and 100 ml of hexane were used as comonomer and solvent, respectively. About 20.42 g of PE copolymer with 2.20 mole % of styrene (Tm=116.5° C.) was obtained. The conversion of the styrene was 43.14%. A big solvent effect was very unex-

EXAMPLE 12

Synthesis of Poly(ethylene-co-p-methylstyrene)

In an argon filled dry-box, 100 ml of toluene, 2.0 g of AlEt$_3$ solution (0.784 mmol/g in toluene) and 4.0 g (34.3 mmol) p-methylstyrene were placed into a Parr 450 ml stainless autoclave equipped with a mechanical stirrer. The sealed reactor was then moved out from the dry box and purged with ethylene gas. After the solution was saturated with 45 psi ethylene gas at 50° C., 50 mg (17.4 umol Ti) of MgCl$_2$/ED/TiCl$_4$ catalyst slurry in 5 ml of toluene was added under ethylene pressure to initiate the polymerization. Additional ethylene was fed continuously into the reactor to maintain a constant pressure of 45 psi during the whole course of the polymerization. After 60 min., the reaction was terminated by adding 100 ml of dilute HCl solution in MeOH. The polymer was isolated by filtering and washed completely with MeOH and dired under vaccum at 50° C. for 8 hrs. About 17.95 g coplymer with 0.24 mole % of p-methylstyrene (Tm=134.4° C., Mw=214,200 and Mw/Mn=6.06) was obtained. The conversion of the p-methylstyrene was 4.5%.

EXAMPLE 13

Synthesis of Poly(ethylene-co-p-methylstyrene)

The similar reaction conditions described in Example 12 were carried out for the polymerization except that 8.0 g (68.2 mmol) of p-methylstyrene was used as comonomer. About 22.11 of PE copolymer with 0.44 mole % of p-methylstyrene (Tm=134° C., Mw=125,700 and Mw/Mn=5.47) was obtained. The conversion of the p-methylstyrene was 5.02%.

EXAMPLE 14

Synthesis of Poly(propylene-co-p-methylstyrene)

In an argon filled dry-box, 100 ml of toluene, 2.0 g of AlEt$_3$ solution (0.784 mmol/g in toluene), 0.22 g of dimethoxylmethylphenylsilane solution (0.5 mmol/g in toluene) and 4.0 g (34.3 mmol) p-methylstyrene were placed into a Parr 450 ml stainless autoclave equipped with a mechanical stirrer. The sealed reactor was then moved out from the dry box and purged with propylene gas and the solution was saturated with 29 psi propylene gas at 50° C. 50 mg (17.4 umol Ti) of MgCl$_2$/ED/TiCl$_4$ catalyst slurry in 5 ml of toluene was added under propylene pressure to initiate the polymerization. Additional propylene was fed continuously into the reactor to maintain a constant pressure of 29 psi during the whole course of the polymerization. After 60 min, the reaction was terminated by adding 100 ml of dilute HCl solution in MeOH. The polymer was isolated by filtering and washed completely with MeOH and dired under vaccum at 50° C. for 8 hrs; After 22.40 g of PP coplymer with 0.36 mole % of p-methylstyrene (Tm=152.9° C., Mw=168,200 and Mw/Mn=5.54) was obtained. The conversion of the p-methylstyrene was 5.63%.

EXAMPLE 15

Synthesis of Poly(propylene-co-p-methylstyrene)

The similar reaction conditions described in Example 14 were carried out for the polymerization except that 8.0 g (68.2 mmol) of p-methylstyrene was used as comonomer. About 22.60 g of PP copolymer with 0.48 mole % of p-methylstyrene (Tm=154.3° C., Mw=202,200 and Mw/Mn=6.23) was obtained. The conversion of the p-methylstyrene was 3.73%.

EXAMPLES 16–22

Copolymerization Reactions of Ethylene (M$_1$) and Styrene Derivatives (M$_2$) Using [C$_5$Me$_4$(SiMe$_2$N$^t$Bu)]TiCl$_2$ Catalyst Following the experimental procedures described in U.S. Pat. No. 5,272,236, both catalysts [C$_5$Me$_4$(SiMe$_2$N$^t$Bu)]TiCl$_2$ (A) and [C$_5$Me$_4$(SiMe$_2$N$^t$Bu)]TiMe$_2$ (B) with mono-cyclopentadienyl highly constrained geometry were prepared with high yields.

In an argon filled dry-box, 100 ml of toluene, 20 mmol of methylaluminoxane (MAO) and 46.6 mmol of comonomer (i.e. styrene or methyl group substituted styrene derivatives) were placed into a Parr 450 ml stainless autoclave equipped with a mechanical stirrer. The sealed reactor was then moved out from the dry box and purged with ethylene gas and the solution was saturated with 45 psi ethylene gas at designated reaction temperature (30° C. or 25° C.), the catalyst solution of 10 umol of [C$_5$Me$_4$(SiMe$_2$N$^t$Bu)]TiCl$_2$ in 5 ml of toluene was added under ethylene pressure to initiate the polymerization. In most cases, additional ethylene was fed continuously into the reactor to maintain a constant pressure of 45 psi during the whole course of the polymerization. After certain reaction time, the reaction was terminated by addition of 100 ml of dilute HCl solution in MeOH, the polymer was isolated by filtering and washed completely with MeOH and dried under vacuum at 60° C. for 12 hrs. The composition of copolymers were determined by $^1$H NMR spectra, and the thermal properties (melting point and crystallinity) were obtained by DSC measurements. The experimental results are summarized in Table 2.

Overall, the experimental results show very similar copolymerization reactivity as those obtained by Et(Ind)$_2$ZrCl$_2$ catalyst. Both highly constrained geometry catalyst systems with mono- and di-cyclopentadienyl ligands are very effective to incorporate p-methylstyrene into polyethylene backbone. More than 80% of p-methyltyrene was interconverted to polymer from within one hour reaction time under constant ethylene pressure (45 psi). High comonomer reactivity is very important in the commercial production processes. In addition, the comonomer reactivity of p-methylstyrene is significantly higher than those of its isomers (o-methylstyrene and m-methylstyrene) and styrene. Both electronic and steric favorable factors of p-methylstyrene in "cationic" metallocene copolymerization, using constrained geometry catalyst systems, clearly distinguish itself from its isomers and styrene. The poly(ethylene-co-p-methylstyrene) with 11 mole % of p-methylstyrene shows low melting point (76° C.) and very small crystallinity (5.4%), which implies the random distribution of p-methylstyrene along the polyethylene backbone. The detail sequence distribution was quantitatively determined by $^{13}$C NMR spectra which will be discussed later.

TABLE 2

A Summary of Copolymerization Reactions Between Ethylene (M₁) and Styrene Derivatives (M₂)
by Using [C₅Me₄(SiMe₂N$^t$Bu)]TiCl₂ Catalyst

| | Reaction Condition | | | | | Copolymer Product | | | | |
|---|---|---|---|---|---|---|---|---|---|---|
| Sample No. | Temp. °C. | Cat. umol | M₁ psi | M₂** mmol | Reaction time (min) | Yield (g) | M₂ Conc. (mole %) | M₂ conversion (%) | Tm (°C.) | Xc (%) |
| 16 | 30 | 10.0 | 45 | none | 60 | 4.27 | 0 | 0 | 133.7 | 51.5 |
| 17 | 30 | 10.0 | 45 | p-MS/46.6 | 60 | 13.0 | 11.0 | 84.3 | 76.0 | 5.40 |
| 18 | 30 | 10.0 | 45 | o-MS/46.6 | 60 | 12.9 | 4.52 | 38.7 | 98.3 | 12.1 |
| 19 | 30 | 10.0 | 45 | m-MS/46.6 | 60 | 5.43 | 2.36 | 9.53 | 119.1 | 23.4 |
| 20 | 30 | 10.0 | 45 | styrene/46.6 | 60 | 13.6 | 5.35 | 48.6 | 98.7 | 10.4 |
| 21 | 25 | 10.0 | 45* | p-MS/46.6 | 6 | 2.1 | 9.5 | 11.69 | | |
| 22 | 25 | 10.0 | 45* | styrene/76.9 | 6 | 2.2 | 10.8 | 8.93 | | |

*ethylene pressure of 45 psi was maintained only in the first minitue of the polymerization.
**p-MS: p-methylstyrene; o-MS: o-methylstyrene; m-MS: m-methylstyrene.

EXAMPLE 23

Structure Characterization of poly(ethylene-co-p-methystyrene and poly(ethylene-co-styrene)

Figure 2:
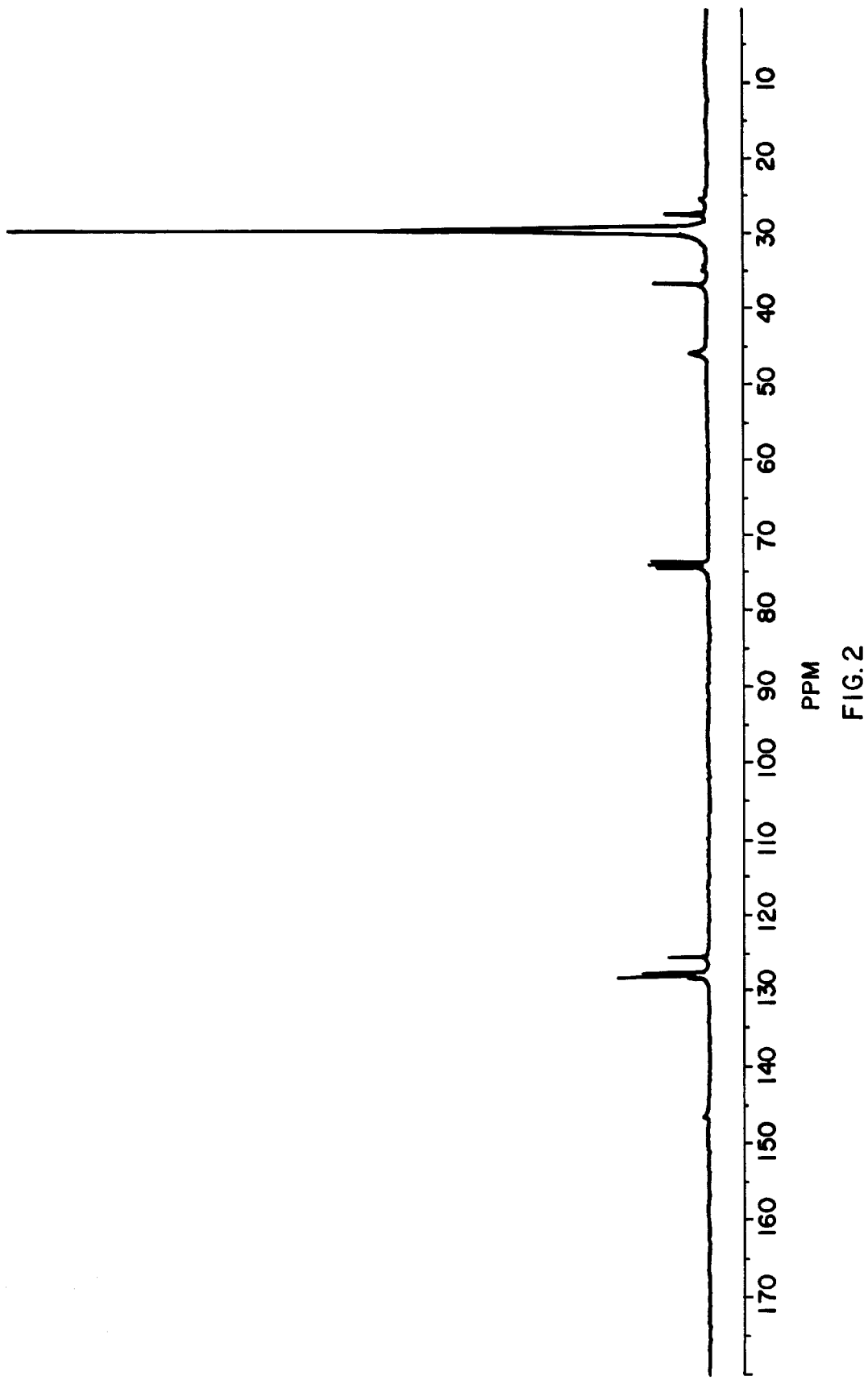
FIG. 2 is a $^{13}$C NMR spectra of poly(ethylene-co-p-styrene)
Figure 3:
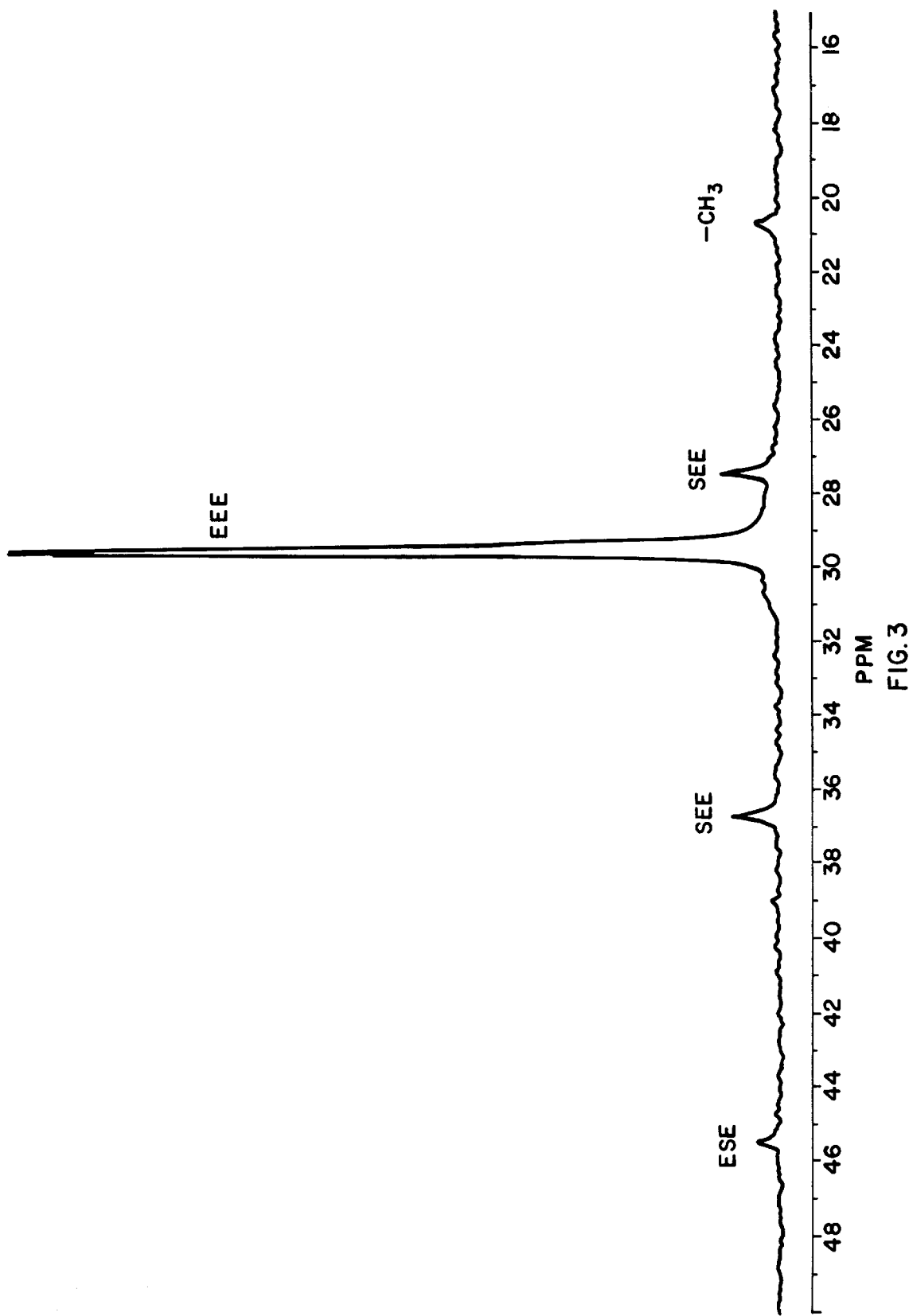
FIG. 3 is an expanded $^{13}$C NMR spectra in the aliphatic region of poly(ethylene-co-p-methylstyrene)
Figure 4:
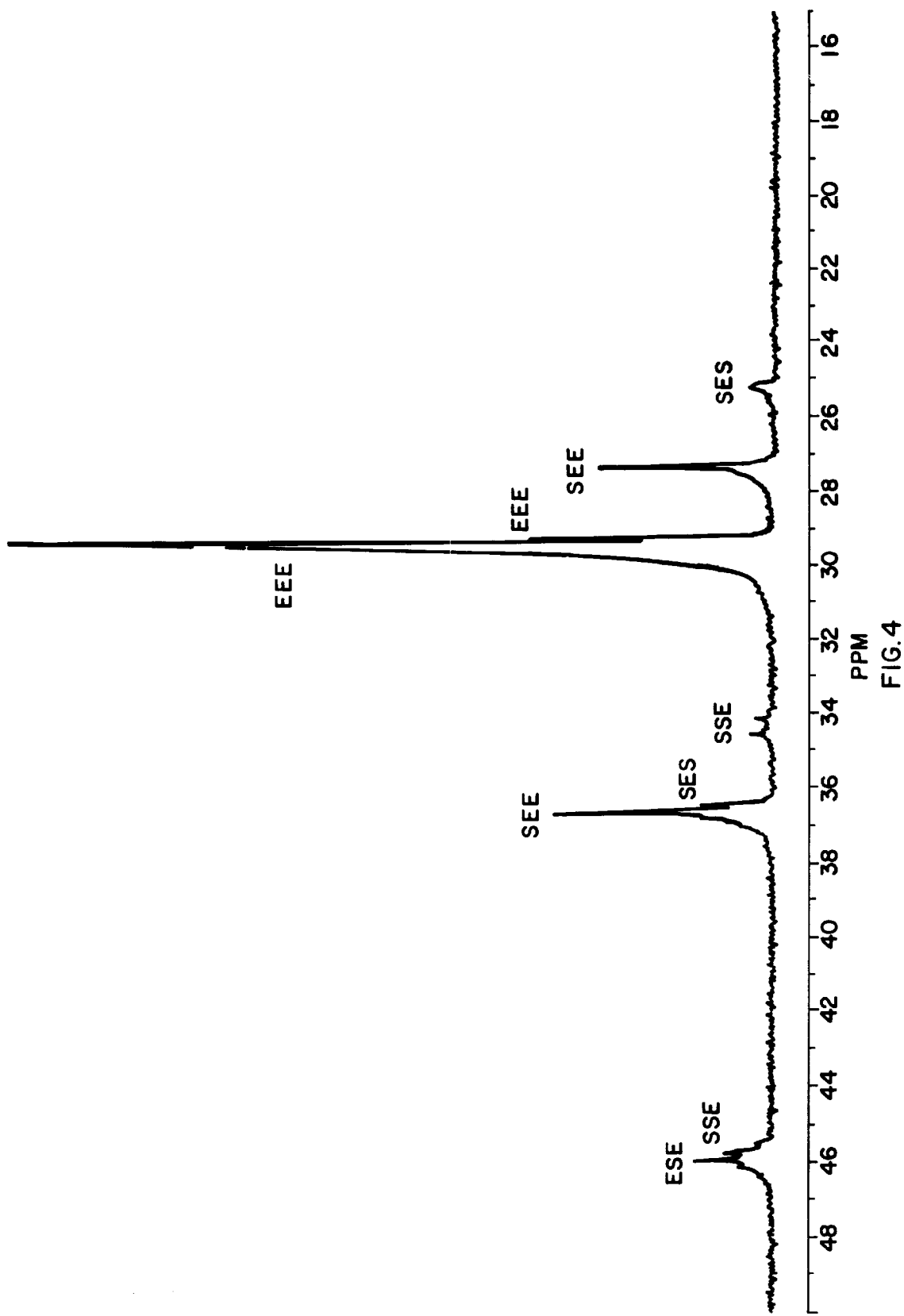
FIG. 4 is an expanded $^{13}$C NMR spectra in the aliphatic region of poly(ethylene-co-p-styrene).

Both poly(ethylene-co-p-methylstyrene) (p282) and poly (ethylene-co-styrene) (p283) copolymers were subjected to the detail $^{13}$C NMR studies to determine their microstructures. FIGS. 1 and 2 show the $^{13}$C NMR spectra of poly (ethylene-co-p-methystyrene) and poly(ethylene-co-styrene), containing about 10 mole % of comonomers (i.e. p-methylstyrene and styrene), respectively. In general, fewer chemical shifts shown in poly(ethylene-co-p-methystyrene) sample imply more homogeneous in the copolymer microstructure. It is logical to expect that the methyl group substitution at para-position will have very little effect on the chemical shifts of methylene and methine carbons in the polymer backbone. In other words, the comparison of aliphatic chemical shifts is a direct comparison of their sequence distributions between poly(ethylene-co-p-methylstyrene) and poly(ethylene-co-styrene). FIGS. 3 and 4 are the expanded $^{13}$C NMR spectra in the aliphatic region of poly(ethylene-co-p-methylstyrene) and poly(ethylene-co-styrene). For detail analysis, the experimental results were compared with the literature reference, T. Mijatake et. al., Makromol. Chem., Macromol. Symp. 66, 203, 1993, and the theoretical chemical shifts which were calculated based on the improved Grant and Paul empirical method, J. Am. Chem. Soc., 86, 2984, 1964, and J. C. Randall, J. of Polym. Sci., Polym. Phy. Ed., 13, 901, 1975. Table 3 shows the summary of the calculated and observed chemical shifts for methylene and methine carbons in the polymer backbone.

TABLE 3

The comparison of calculated and observed chemical shifts for methylene and methine carbons in poly(ethylene-co-p-methylstyrene) P(E-co-p-MS) and poly(ethylene-co-styrene) P(E-co-S).

| Carbon type* | Sequence** | Calculated (ppm) | Observed P(E-co-p-MS) (ppm) | Observed P(E-co-S) (ppm) |
|---|---|---|---|---|
| $S_{\beta\beta}$ | SES | 25.91 | | 25.22 |
| $S_{\beta\alpha}$ | SEE | 28.01 | 27.74 | 27.36 |
| $S_{\delta\delta}$ | EEE | 30.13 | 29.80 | 29.26 |
| $S_{\gamma\delta}$ | EEE | 30.56 | | 29.42 |
| $S_{\alpha\alpha}$ | SSE | 34.75 | | 34.13/34.60 |
| $S_{\alpha\delta}$ | SES | 37.10 | 37.04 | 36.48 |
| $S_{\alpha\gamma}$ | SEE | 37.10 | | 36.65 |
| $T_{\beta\beta}$ | SSS | 41.60 | | |
| $T_{\beta\delta}$ | SSE | 45.53 | | 45.64 |
| $T_{\delta\delta}$ | ESE | 47.60 | 45.77 | 46.08 |

*S: methylene carbon; T: methine carbon; α, β, γ, δ: distance from methylene or methine carbon to the adjacent aromatic substituted methine carbon. (δ includes the distance beyond four carbons away)
**E: ethylene; S: styrene or p-methylstyrene In general, the calculated and experimental results are in good agreement. The small deviation in the exact chemical shift most likely is due to the treatment of phenyl side group which was not substantiated from alkane group in Grant and Paul empirical method. Every chemical shift in FIG. 3 can be clearly assigned. In addition to the two chemical shifts (21.01 and 29.80 ppm), corresponding to the methylene carbons from ethylene monomer and methyl carbons form p-methylstyrene, respectively, there are three well-resolved peaks (27.74, 37.04 and 45.78 ppm) corresponding to methylene and methine carbons from p-methylstyrene units which are separated by multiple ethylene units along the polymer chain. On the other hand, the spectrum in FIG. 4 shows much more complicated methylene and methine carbon species in poly(ethylene-co-styrene) sample with several relatively broad bands. Many consecutive and adjacent styrene units (SSE and SES) clearly exist in the polymer chain, as shown and explained in Table 3. There is no detectable SSS sequence in the copolymer.

EXAMPLE 24

Synthesis of Poly(ethylene-ter-propylene-ter-p-methylstyrene)

In a terpolymerization reaction, 5 mmol p-methylstyrene (p-MS) was added into a Parr 450 ml stainless autoclave reactor with toluene (100 ml) and methylaluminoxane (3 ml) (2.5 Min toluene). Pre-mixed ethylene (80 psi) and propylene (40 psi) were then connected to the reactor. After saturating with both ethylene and propylene gases at 50° C. (with approximately 1:2 ethylene:propylene mole ratio in solution), the total pressure in the reactor was controlled at 30 psi. The polymerization reaction was initiated by charging a $[C_5Me_4(SiMe_2N^tBu)]TiCl_2$ (2.5 mmol) toluene solution into the monomer mixture. A constant mixed ethylene/propylene pressure was maintained throughout the polymerization process. To assure the constant comonomer ratio, the polymerization was terminated within 15 minutes by adding dilute HCl/MeOH solution. The resulting terpolymer was isolated by filtering and was washed completely with MeOH and dried under vacuum at 50° C. for 8 hrs. About 2.55 g of poly(ethylene-ter-propylene-ter-p-methylstyrene) (EP-p-MS) terpolymer was obtained. The terpolymer comprised 54 mole % of ethylene, 44 mole % of propylene and 2 mole % of p-methylstyrene and had a Tg of −46° C.

tion temperature (Tg) having a flat baseline in each DSC curve indicates homogeneous terpolymer microstructures.

EXAMPLE 34

Synthesis of Poly(ethylene-ter-1-octene-ter-p-methylstyrene)

In a terpolymerization reaction, 1-octene (40 ml) and p-methylstyrene (40 mmol) were mixed with 100 ml of toluene and 3 ml of methylaluminoxane (MAO) (2.5 M in toluene) in a Parr 450 mL stainless autoclave equipped with a mechanical stirrer. The sealed reactor was then saturated with $4.0×10^5$ Pa (4 bar) ethylene gas at 50° C. before adding catalyst solution $[C_5Me_4(SiMe_2N^tBu)]TiCl_2$ (2.5 mmol) in toluene to initiate polymerization. Additional ethylene was fed continuously into the reactor by maintaining a constant pressure about $4.0×10^5$ Pa during the whole course of the polymerization. After 30 minutes, the reaction was terminated by adding 100 mL of dilute HCl solution in MeOH. The polymer was precipitated in methanol and isolated by filtering. Further purification was carried out by redissolving the polymer in hexane solution an repreciptating it in methanol twice. After vacuum drying at 50° C. for 8 h, 7.94 g of poly(ethylene-ter-1-octene-ter-p-methylstyrene) (EO-p-MS) terpolymer was obtained.

TABLE 4

A Summary of Terpolymerization[a)] of Ethylene, Propylene and p-MS by using $[(C_5Me_4)SiMe_2N(t-Bu)TiCl_2]$/MAO

| Example No. | Ethylene/ Propylene mixing ratio (psi/psi) | Monomer Concn. in the Feed (mol/l) | | | Catalyst Activity Kgmol⁻¹h⁻¹ | Copolymer Composition (mol %) | | | Tg (° C.) | Mw (g/mol) | Mn (g/mol) | PD |
|---|---|---|---|---|---|---|---|---|---|---|---|---|
| | | Ethylene | Propylene | p-MS | | [E] | [P] | [p-MS] | | | | |
| 25 | 60/60 | 0.10 | 0.43 | 0.1 | $5.4 × 10^3$ | 37.0 | 58.5 | 4.5 | −20.3 | 184149 | 90634 | 2.0 |
| 26 | 60/60 | 0.10 | 0.43 | 0.3 | $4.9 × 10^3$ | 39.2 | 52.9 | 7.9 | −19.1 | 194245 | 97634 | 2.0 |
| 27 | 60/60 | 0.10 | 0.43 | 0.5 | $5.3 × 10^3$ | 40.3 | 48.6 | 11.1 | −9.1 | 188861 | 80855 | 2.3 |
| 28 | 70/50 | 0.12 | 0.35 | 0.3 | $4.0 × 10^3$ | 46.4 | 43.6 | 10.0 | −20.7 | 198199 | 74890 | 2.7 |
| 29 | 50/70 | 0.08 | 0.50 | 0.3 | $3.5 × 10^3$ | 32.4 | 59.2 | 8.4 | −12.4 | 183180 | 91786 | 2.0 |
| 30 | 80/40 | 0.13 | 0.28 | 0.05 | $4.1 × 10^3$ | 54.4 | 43.8 | 1.8 | −45.8 | 237702 | 107519 | 2.2 |
| 31 | 70/50 | 0.12 | 0.35 | 0.05 | $4.0 × 10^3$ | 46.1 | 52.3 | 1.6 | −41.0 | 195760 | 75028 | 2.6 |
| 32 | 85/35 | 0.14 | 0.25 | 0.03 | $4.4 × 10^3$ | 56.3 | 43.1 | 0.6 | −48.6 | 269400 | 104335 | 2.6 |
| 33 | 80/40 | 0.13 | 0.28 | 0.03 | $3.8 × 10^3$ | 50.7 | 48.6 | 0.7 | −45.9 | 244331 | 85506 | 2.9 |

[a)]polymerization conditions: 100 ml toluene; [Ti] = $2.5 × 10^{-4}$ mol; [MAO]/[Ti] = 3000; 50° C.; 15 min

EXAMPLES 25–33

Synthesis of Poly(ethylene-ter-propylene-ter-p-methylstyrene)

In a series of examples, high molecular weight ethylene/propylene/p-methylstyrene terpolymers were prepared in accordance with reaction procedure described in Example 24, except that the monomer feeds were varied as indicated in Table 4. The terpolymers obtained were characterized by high temperature $^1H$ NMR and gel permeation chromatography (GPC) to determine their compositions and molecular weights (with molecular weight distributions), respectively. The melting point (Tm) and glass transition temperature (Tg) were measured by differential scanning calorimetry (DSC). The results obtained are set forth in Table 4. In general, the incorporation of p-methylstyrene in ethylene-propylene copolymer was very effective by using $[C_5Me_4(SiMe_2N^tBu)]TiCl_2$ catalyst. Terpolymers having a high molecular weight, and a narrow molecular weight and composition distribution, were observed. DSC results show no detectable melting point (Tm) in terpolymers containing less than 70 mole % ethylene units. The sharp glass transi-

EXAMPLES 35–43

Synthesis of Poly(ethylene-ter-1-octene-ter-p-methylstyrene)

In a series of examples, high molecular weight of ehtylene/1-octene/p-methylstyrene terpolymers were prepared in accordance reaction procedures described in Examples 34, except that the monomer feeds were varied as indicated in Table 5. The composition and molecular weight (with molecular weight distribution) of each terpolymer were determinated by high temperature $^1H$ NMR and gel permeation chromatography (GPC), respectively. The Tm and Tg were measure by differential scanning calorimetry (DSC). The results obtained are set forth in Table 5. In general, the terpolymerization reactions of ethylene/1-octene/p-methylstyrene were very effective when using $[C_5Me_4(SiMe_2N^tBu)]TiCl_2$/MAO as the polymerization catalyst. A broad composition range of terpolymers were obtained with high molecular weight, and narrow molecular weight and composition distributions. DSC results show no detectable melting point (Tm) in the terpolymers containing less than 70 mole % ethylene units. The sharp glass transition temperature (Tg) with flat baseline in each DSC curve indicates homogeneous terpolymer microstructures. In general, the terpolymers exhibit a low Tg (<−50° C.) in a wide range of copolymer compositions, even ones with relatively high p-MS contents (>7 mole %).

In general, the modification reactions are effective. The MA graft content is proportional to the initiator concentration. Some polymer degradation did take place with the increase of intitator concentration. However, several useful MA-modified PP copolymers having a high molecular weight and MA concentration have been prepared.

TABLE 5

A summary of terpolymerization[a)] of ethylene, 1-octene and p-MS using [($C_5Me_4$)$SiMe_2$N(t-Bu)]$TiCl_2$/MAO catalyst.

| Example | Monomer concn. in the feed, mol/L | | | Yield | Copolymer composition mol % | | | $T_g$ | $M_w$ | $M_n$ | PD |
|---|---|---|---|---|---|---|---|---|---|---|---|
| | E[j)] | 1-Oct | p-MS | g | [E] | [O] | [p-MS] | ° C. | g/mol | g/mol | |
| 35 | 0.20 | 0.80 | 0.10 | 7.3 | 54.2 | 43.0 | 2.7 | −56.2 | 173,989 | 74,703 | 2.3 |
| 36 | 0.40 | 0.80 | 0.10 | 10.1 | 61.1 | 36.0 | 2.9 | −58.1 | 219,752 | 96,802 | 2.3 |
| 37 | 0.40 | 0.80 | 0.20 | 9.8 | 60.3 | 36.3 | 4.4 | −55.7 | 182,185 | 77,497 | 2.4 |
| 38 | 0.40 | 0.40 | 0.20 | 8.2 | 59.6 | 34.0 | 6.4 | −50.1 | 208,920 | 86,812 | 2.4 |
| 39 | 0.40 | 0.20 | 0.20 | 6.4 | 80.2 | 14.1 | 5.7 | −37.3 | 227,461 | 91,490 | 2.5 |
| 40 | 0.40 | 0.80 | 0.40 | 9.0 | 63.4 | 29.3 | 7.3 | −50.3 | 202,085 | 96,035 | 2.1 |
| 41 | 0.40 | 0.60 | 0.40 | 9.1 | 67.2 | 24.7 | 8.1 | −48.2 | 205,124 | 93,763 | 2.2 |
| 42 | 0.40 | 0.40 | 0.40 | 7.9 | 73.3 | 18.5 | 8.1 | −44.7 | 246,300 | 122,306 | 2.0 |
| 43 | 0.40 | 0.60 | 0.15 | 9.0 | 64.7 | 31.3 | 4.0 | −55.7 | 224,476 | 102,617 | 2.2 |

EXAMPLES 44–45

Maleic Anhydride Graft Reactions of Poly (propylene-co-p-methylstyrene) by Solution Process Under nitrogen atmosphere, 5 g of poly(propylene-co-p-methylstyrene) was dissolved in 50 g biphenyl at 145° C. 3 g of maleic anhydride (MA) and the amount of t-butyl peroxide (t-BPO) initiator indicated in Table 6 were added to the solution. to the solution. A graft reaction took as the resulting solution was maintained under constant stirring for 3 hrs. The reaction was terminated and the resulting graft copolymer was precipitated by adding the reaction mixture to 200 ml of acetone. The copolymer was isolated by filtration, was washed in acetone four times, and then was dried under vacuum at 50° C. for 24 hrs. The incorporated MA content was determined by IR spectrum by using the following equation: MA wt %=K($A_{1780}$/d), where $A_{1780}$ is the absorbence of carbonyl group at 1780 cm$^{-1}$ and d is the thickness (mm) of the film, K is constant and determined by the calibration curve of several known MA grafted PP samples. The intrinsic viscosity of the copolymer was measured in a dilute solution of decahydronaphthalene (Decalin) at 135° C. with a Cannon-Ubbelohde viscometer. The viscosity molecular weight was calculated by the Mark-Houwink equation: $[\eta]=KM^\alpha$, where K=1.05×10$^{-5}$ and α=0.8. The melting point of the polymer was measured by DSC. The results obtained are set forth in Table 6.

TABLE 6

A Summary of Maleic Anhydride Modified PP[a] by Solution Process

| Examples | Initiator (wt %) | MA (wt %) | Tm (°C.) | [η] (dl/g) | Mv (X10$^{-5}$) (g/mol) |
|---|---|---|---|---|---|
| 43 | 0.5 | 0.7 | 155.5 | 0.92 | 0.85 |
| 44 | 1.0 | 2.8 | 151.4 | 0.87 | 0.79 |
| 45 | 1.5 | 3.6 | 149.9 | 0.61 | 0.51 |

[a]Starting polymer is poly(propylene-co-p-methylstyrene), with 0.6 mole % p-methylstyrene and Mv approximately 1.6 × 10$^5$ g/mole.

EXAMPLE 46

Maleic Anhydride Graft Reactions of Poly (propylene-co-p-methylstyrene) by Melt Process A melt reaction was carried out in a Brabender internal mixer (PL2000 Plasti-Corder mixer) equipped with a twin counter-rotated roller blade under nitrogen. At 180° C., 40 g poly(propylene-co-p-methylstyrene) (Mv approximately 1.6×10$^5$ g/mole and 0.6 mole % p-methylstyrene) and 5 MA were loaded into the mixer with rotor rate maintained at 50 rpm. After 2 minutes of mixing, an initiator (2,5-bis(t-butylperoxy)-2,5-dimethyl-3hexyne) (BDH) was charged in four portions during about 6 minutes reaction time. The polymer melt was then removed from the mixer and dissolved in xylene. The polymer was precipitated from the xylene solution by pouring the solution into acetone. The polymer was isolated by filtration, washed with acetone four times and dried under vacuum at 50° C. for 24 hrs. The incorporated MA content was determined by IR spectrum analysis to be approximately 1.4 wt %. The melting point of the polymer (Tm) was determined by DSC and the viscosity molecular weight (Mv) was calculated by the Mark-Hoiuwink equation. The melting point (Tm) was found to be 156° C. and viscosity molecular weight (Mv) was calculated to be approximately 1.1×10$^5$ g/mol.

EXAMPLES 47–52

Process Maleic Anhydride Graft Reactions of Poly (propylene-co-p-methylstyrene) by Suspension Under nitrogen atmosphere, 5 g of poly(propylene-co-p-methylstyrene) was suspended in 50 g biphenyl at 120–130° C. After adding 3 g of maleic anhydride (MA) to the solution, a graft reaction was initiated by charging dicumyl peroxide (DCP) initiator in the quantity indicated in Table 7. The graft reaction was permitted to continue for the period indicated in Table 7. In some cases, a small amount of styrene was added to the reaction mixture. The reaction was terminated by pouring the reaction mixture into 200 ml of acetone. The resulting copolymer was isolated by filtration, and washed with acetone four times, and then dried under vacuum at 50° C. for 24 hrs. IR, DSC and intrinsic viscosity measurements were used to determine the molecular structure of the resulting MA-modified PP. The results obtained are set forth in Table 7.

TABLE 7

A Summmary of Maleic Anhydride Modified PP by Suspension Process

| Examples | Initiator (wt %) | Styrene (g) | Reaction Temp. (° C.) | Time (hr) | MA wt % | Tm (° C.) | [η] (dl/g) | Mv (× 10$^{-5}$) |
|---|---|---|---|---|---|---|---|---|
| 47 | 1.0 | 0 | 130 | 3 | 0.9 | 155.2 | 1.48 | 1.53 |
| 48 | 2.0 | 0 | 130 | 3 | 1.2 | 153.6 | 1.51 | 1.57 |
| 49 | 1.0 | 0 | 130 | 6 | 2.3 | 151.5 | 1.52 | 1.58 |
| 50 | 1.0 | 0 | 120 | 6 | 0.2 | 156.0 | 1.45 | 1.50 |
| 51 | 1.0 | 1.8 | 130 | 3 | 3.1 | 151.6 | 1.52 | 1.60 |
| 52 | 1.0 | 3.6 | 130 | 3 | 5.2 | 150.4 | 1.53 | 1.62 |

The overall results indicated that the suspension grafting reactions are very selective on the p-methylstyrene groups, with little change in the polymer molecular weight. Adding a small amount styrene during the modification reactions increases the MA graft content. It seems that the reaction temperature at 130° C. is the best condition, in which the polymer is fully swollen in the solvent and the grafting is greatly selective at p-methylstyrene units.

EXAMPLE 53

Oxidation Reaction of Poly(ethylene-co-p-methylstyrene)

About 1.0 g of copolymer obtained from Example 3 was added to the glass flask containing 75 ml of phenylchloride and 25 ml of acetic acid mixture together with 0.12 g of cobalt (III) acetate tetrahydrate and 0.21 g of sodium bromide. The suspension mixture was heated to 105° C. and oxygen bubbled through for 3 hrs. the reaction was then terminated with MeOH, washed with MeOH, water and acetone and dried under vaccum at 50° C. for 24 hrs. About 0.90 g polymer was obtained, —CHO and —COOH groups were observed by $^1$H NMR spectrum. DSC curve of functionalized polymer shows a sharp peak with the melting point at 126.6° C. (6.6° C. higher than that of ethylene/p-methylstyrene copolymer before oxidation). This functionalized polymer is completely soluble in p-xylene and trichlorobenzene (TCB) at high temperature.

EXAMPLE 54

Chlorination Reaction of Poly(ethylene-co-p-methylstyrene)

About 0.5 g of Poly(ethylene-co-p-methylstyrene) obtained from Example 2 was swelled in 20 ml of a chloform/dichlormethane (1/1) mixed solvents. After adding 90 ml of sodium hypochlorite solution (>4.0% Cl available), the pH of solution was adjusted to a value in the range of 8.0–9.0 by using concentrated hydrochloric acid. Benzyltriethyliammonium chloride (0.196 g) was then added to the mixtures. The suspended solution was then stirred vigorously for 23 hrs under N$_2$ atmosphere. The polymer was isolated by filtering, washing with methanol, water, dichloromethane/methanol, methanol, and dried under vacuum at 50° C. for 24 hrs. About 0.60 g polymer was obtained. The CH$_2$Cl groups in copolymer were observed in $^1$H NMR spectrum. A DSC curve of functionalized polymer shows a sharp peak with the melting point at 117.1° C. (5.5° C. lower than that of copolymer before chlorination). This functionalized polymer is completely soluble in p-xylene and trichlorobenzene (TCB) at high temperature.

EXAMPLE 55

Chlorination Reaction of Poly(ethylene-co-p-methylstyrene)

About 2 g of poly(ethylene-co-p-methylstyrene), containing 3.13 mole % of p-methylstyrene was mixed with 50 mg of AIBN in a 150 ml air-free flask equiped with a refluxing condenser. Anhydrous CCl$_4$(70 ml) was added, then was followed by 0.75 ml of sulfuryl chloride which was injected into the flask while stirring under N$_2$ and dark. After stirring the reaction mixture at 60° C. for 2 hrs the reaction was cooled down to room temperature. The resulting polymer was precipitated in methanol and washed repeatly with acetone and methanol. This functionalized polymer is completely soluble in p-xylene and trichlorobenzene (TCB) at high temperature. $^1$H NMR spectrum, showing chemical shifts at 4.63 and 3.95 ppm, indicates the chlorinated product.

EXAMPLE 56

Bromination Reaction of Poly(ethylene-co-p-methylstyrene)

About 2 g of poly(ethylene-co-p-methylstyrene), containing 3.13 mole % of p-methylstyrene, was mixed with 0.542 g (3.05 mmol) of N-bromosuccinimide (NBS) and 41.2 mg of benzoyl peroxide in a 150 ml air-free flask equiped with a refluxing condenser. After 40 ml of anhydrous CCl$_4$ was injected into the flask, the reaction was heated up to 60° C. for 2 hrs under N$_2$ and dark condition. The reaction mixture was then cooled down to room temperature, and the resulting polymer was precipiated by methanol and washed repeatly with acetone and methanol. The polymer is completely soluble in TCB at high temperature. $^1$H NMR spectrum, showing a chemical shift at 4.54 ppm, indicates the brominated product.

EXAMPLE 57

Bromination Reaction of Poly(ethylene-co-p-methylstyrene)

About 1.0 g of poly(ethylene-co-p-methylstyrene) obtained from Example 15 was swelled in 100 ml of anhydrous carbon tetrachloride solution. Under the dark, 0.30 g of N-bromosuccinimide and 0.01 g of benzoyl peroxide were added to the mixture. The bromination reaction was carried out at the boiling point of the solvent for 3 hrs under nitrogen atmosphere before the termination by methanol. The polymer was isolated by filtering, washing with methanol, water, acetone, and dried under vacuum at 50° C. for 24 Hrs. About 1.05 g brominated polymer was obtained. From $^1$H NMR studies, all para-CH$_3$ groups were brominated to —CH$_2$Br groups. This functionalized polymer is completely soluble in TCB at high temperature.

EXAMPLE 58

Lithiation reaction of poly(ethylene-co-p-methylstyrene)

In an argon filled dry box, 10 g of poly(ethylene-co-p-methylstyrene) with 2.76 mol % of p-methylstyrene (9.08 mmol) was suspended in 100 ml of cyclohexane in a 250 ml air-free flask with a magnetic stirr bar, 21 ml (27.3 mmol) of 1.3 M s-BuLi solution and 4.2 ml (27.3 mmol) of TMEDA were added to the flask, the flask was then brought out of dry box and heated up to 60° C. for 4 hrs under N$_2$, the reaction was then cooled down to room temperature and moved back to the dry box. The resulting polymer was filtered and washed completely with cycohexane until decoloration of filtrate, then was dried under vaccum. A lithiated yellow polymer podwer was obtained.

EXAMPLE 59

Carboxylation of poly(ethylene-co-p-4-methylstyrene)

About 1 g of the lithiated polymer obtained from Example 58 was suspended in 20 ml of dry THF at room temperature. High purity CO$_2$ gas was bubbled through the slurry for about 1 hr until the color of polymer turning to white. The reaction was then terminated by adding dilute HCl solution in methanol. The resulting polymer was then filtered and washed repeatly with hot water and methanol, then was dried under vaccum. IR measurement clearly shows —=O, —OH peaks; $^1$H NMR spectrum shows a peak at 3.68 ppm corresponding to the methylene proton next to phenyl and —COOH groups.

EXAMPLE 60

Lithiation and Silyation of Poly(ethylene-co-p-methylstyrene)

In an argon filled dry box, 8 g of poly(ethylene-co-p-methylstyrene) containing 0.48 mole % of p-methylstyrene was mixed with 5.6 ml of 1.3 M sec-BuLi and 2.2 ml TMEDA in 100 ml cyclohexane. The lithiation took place at 65° C. for 4 Hrs. The resulting polymer was filtered and washed repeatly with hexane. About 0.5 g of the lithiated polymer was then suspended in 15 ml THF, and 1.0 ml of Me$_3$SiCl was added to the slurry. After reacting for 2 hours at room temperature, the silylated PP was collected by filtering and washing repeatly with THF, methanol, water and methanol, then was dried under vaccum. $^1$H NMR spectrum shows a strong peak at 0.05 ppm corresponding to the methyl proton next to Si. The silylation efficiency was about 70%.

EXAMPLE 61

Silylation of Poly(ethylene-co-p-methylstyrene)

About 1 g of the lithiated polymer obtained from example 58 was suspended in 20 ml of dry THF, 0.5 g of Me$_3$SiCl was added and stirred at room temperature for 2 hrs. The resulting polymer was then filtered and washed repeatly with THF, methanol, water and methanol, then was dried under vaccum. $^1$H NMR spectrum shows a strong peak at 0.05 ppm corresponding to the methyl proton next to Si.

EXAMPLE 62

Aldehydation of Poly(ethylene-co-p-methylstyrene)

After 1 g of the lithiated polymer, obtained from example 58, was suspended in 20 ml of dry THF, 0.5 g of dry DMF was added and stirred at room temperature for 2 hrs. The resulting polymer was then filtered and washed repeatly with THF/H$_2$O, THF/H$_2$O/HCl, H$_2$O, THF/H$_2$O, THF and methanol, and was then dried under vaccum. Slight yellow polymer was obtained. IR spectrum of the resulting sample shows —CHO absorption.

EXAMPLE 63

Preparation of Poly(ethylene-co-p-3-methylstyrene)

After 1 g of the lithiated polymer, obtained from example 58, was suspended in 20 ml of dry THF, 0.5 g of BrCH$_2$CH$_2$BR was added and stirred at room temperature for 2 hrs. The resulting polymer was filtered and washed repeatly with THF, ether, THF/H$_2$O,H$_2$O, THF, methanol and then was dried under vaccum. $^1$H NMR spectrum shows a strong peak at 4.96 ppm, corresponding to the methylene proton next to Br.

EXAMPLE 64

Hydroxylation of Poly(ethylene-co-p-methylstyrene)

After 1 g of the lithiated polymer, obtained from example 58, was suspended in 20 ml of dry THF, 3 g of 1.0 M of CH$_3$O-9-BBN was added and stirred at room temperature for 2 hrs. The resulting polymer was filtered and washed repeatly with THF. The THF slurry containing polymer was then oxidized by adding NaOH/H$_2$O$_2$ at 40° C. for 4 Hrs. The hydroxylated polymer was collected by filtering, then washing with methanol, H$_2$O/HCl, water and methanol and dried under vaccum. $^1$H NMR spectrum shows a strong peak at 4.65 ppm, corresponding to the methylene proton next to phenyl and hydroxy groups.

EXAMPLE 65

Preparation of Poly(ethylene-co-p-2-methylstyrene)

1 g of the lithiated polymer, obtained from example 58, was suspended in 20 ml of dry THF at room temperature Ethylene oxide gas was bubbled through the slurry for about 2 hr. Decoloration of the sample indicted the complete reaction, which was then terminated by adding dilute HCl solution in methanol. The resulting polymer was filtered and washed repeatly with methanol, hot water and methanol and dried under vaccum. This functionalized polymer is completely soluble in TCB at high temperature. $^1$H NMR spectrum shows two peaks at 4.04 and 273 ppm, corresponding to two methylene units between phenyl and hydroxy groups.

EXAMPLE 66

Amination of Poly(ethylene-co-p-4methylstyrene)

About 1.0 g of brominated polymer, obtained form example 56, was suspended in 20 ml of toluene with 0.5 g of tetrabutylamminium bromide and 0.2 g of potassium phthalimide. Under N$_2$ condition, the slurry solution was stirred and heated up to 100° C. for 3 Hrs. The reaction mixture was then cooled down to room temperature before filteration. The filtrated polymer was washed with toluene, THF and EtOH repeatly before re-suspending in ethanol solution. To this slurry solution, 2 ml of $N_2H_4$ was added and stirred at room temperature for 2 hrs. The white polymer powder was recovered by filteration, washing with EtOH and then vacuum dry.

EXAMPLE 67

Amidation of Poly(ethylene-co-p-methylstyrene)

After 1 g of the lithiated polymer, obtained from Example 58, was suspended in 20 ml of dry benzene, 2 ml of phenylisocyanate was added and stirred at room temperature for 1 hr, then heated up to 60° C. for other 1 hour. The resulting polymer was then filtered and washed repeatly with EtOH, THF, THF/$H_2O$, $H_2O$, THF/$H_2O$, THF and methanol, and dried under vaccum. The resulting polymer was examined by IR and $^1H$ NMR measurements, with IR absorption peaks at 1665, 1599, 1545 $cm^{-1}$ and chemical shifts at 3.71, 7.40 ppm, both indicate the amidated poly(ethylene-co-p-methylstyrene) structure.

EXAMPLE 68

Phosphination of Poly(ethylene-co-p-methylstyrene)

After 1 g of the lithiated polymer, obtained from Example 58, was suspended i 20 ml of dry THF, 1 g chlorodiphenylphosphine was added and stirred at room temperature for 2 hrs. the resulting polymer was then filtered and washed repeatly with THF, THF/$H_2O$, $H_2O$, THF/$H_2O$, THF and methanol, and dried under vaccum. $^1H$ NMR spectrum, showing chemical shifts at 3.61, 3.64, 7.45 and 7.70 ppm, indicated the phosphinated polymer.

EXAMPLE 69

Thiolation of Poly(ethylene-co-p-methylstyrene)

After 1 g of the lithiated polymer, obtained from Example 58, was suspended in 20 ml of dry THF, 0.5 g of sulfur was added and stirred at room temperature for 2 hrs. About 20 ml of 3 N HCl was added and stirred for another 30 minutes. The resulting polymer was then filtered and washed repeatly with THF, $CCl_4$, EtOH, $H_2O$, THF/$H_2O$, THF and methanol, and dried under vaccum. A slightly yellow polymer was obtained.

EXAMPLES 70–81

PE Graft Copolymers Prepared by Graft-from Reactions

About 10 g of poly(ethylene-co-p-methylstyrene), containing 2.44 mole % of p-methylstyrene), was lithiated by the procedure described in Example 58. The lithiated polyethylene copolymer was then suspended in hexane or THF solvent. The graft-from reactions were carried out in slurry solution by reacting the lithiated polyethylene copolymer with anionic polymerizable monomers, such as styrene, methyl methacrylate (MMA), vinyl acetate, acrylonitrile and p-methylstryene. After the reaction time indicated in Table 8. 10 ml of isopropanol was added to terminate the graft-from reaction. The precipitated polymer was filtered and then subjected to fractionation. Good solvents for backbone and side chain polymers were used during the fractionization, using a Soxhlet apparatus under $N_2$ for 24 hours. The soluble fractions were isolated by vacuum-removal of solvent. Usually, the total soluble fractions were less than 5% of the product The major insoluble fraction was PE graft copolymer, which was completely soluble in xylene or trichlorobenzene at elevated temperatures. The graft copolymer structures and compositions were determined by IR, $^1H$ NMR, GPC and DSC studies. Table 8 summarized the reaction conditions and the experimental results.

EXAMPLE 82–84

Synthesis of PE-g-PCL Graft Copolymers

About 10 g of poly(ethylene-co-p-methylstyrene), containing 2.44 mmol % of p-methylstyrene), was lithiated by the procedure described in Example 58. The lithiated polymer was suspended in 100 ml of THF, ethylene oxide was bubbled through the slurry untill decoloration, the polymer was filtered and washed with THF and dried. This polymer was further reacted with 10 ml 1.8 M of $AlEt_2Cl$ in 100 ml of toluene at room temperature for 4 hrs, the PE-OAlEt$_2$ solid was filtered and washed completely with toluene and hexane and dried. The product was used as polymer substrate for graft-from polymerization. The cyclic ester ε-caprolactone (Aldrich Chemical) was purified by drying over calcium hydride and distilling under reduced pressure. In the dry box, caprolactone was added to a slurry of PE-OAlEt$_2$ in 20 ml of toluene. The reaction was stirred at room temperature for certain reaction time, at which time the reaction was terminated by the addition of MeOH. The polymer was isolated by precipitating into acidified MeOH. The polymer mass extracted with hot acetone in a soxhelet apparatus under $N_2$ for 48 hours to remove any ε-CL homopolymer, which is soluble in acetone. The insoluble polymer was PE-g-PCL which was completely soluble in xylene at elevated temperature. The polymer structures and compositions were confirmed by IR, $^1H$ NMR, GPC and DSC studies. Table 9 summarizes the reaction conditions and results.

EXAMPLES 85–95

PP Graft Copolymers Prepared by Graft-from Reactions

The lithiated PP obtained from Example 60 was used in the graft-from polymerization with styrene, MMA, AN and p-methylstyrene, respectively. The similar anionic graft-from reaction procedure used in examples 70–81 was applied to polypropylene cases. The graft copolymer structures and compositions were determined by IR, $^1H$ NMR, GPC and DSC studies. The reaction conditions and results for individual examples are summarized in Table 10.

EXAMPLE 96–102

Synthesis of PP-g-polybutadiene Graft Copolymers

Poly(ethylene-co-p-methylstyrene), containing 0.78 mole % of p-methylstyrene, was lithiated by the same procedure shown in example 60. The lithiated PP polymer was then suspended in hexane or THF solvent with certain quantity of 1,2-dipiperidinoethane. The graft-from reactions were carried out in slurry solution by reacting the lithiated polymer with butadiene at room temperature. After certain reaction time, 10 ml of isopropanol was added to terminate the graft-from reaction. The precipitated polymer was filtered and then subjected to fractionation. Hexane was used to remove polybutadiene homopolymer. The major insoluble fraction was PP-g-polybutadiene graft copolymer, which was completely soluble in trichlorobenzene at elevated temperatures. The graft copolymer structures and compositions were determined by IR, $^1H$ NMR, GPC and DSC studies. Table 11 summarizes the reaction conditions and the experimental results.

TABLE 8

A summary of the anionic graft-from polymerization reactions by using lithiated poly(ethylene-co-p-methylstyrene) as initiator

| Example | lithiated polymer g | comonomer g | solvent | Temp. °C. | time hr. | graft copolymer g | cononomer in graft copolymer mole % |
|---|---|---|---|---|---|---|---|
| 70 | 1.5 | ST/1.9 | hexane | r.t. | 1 | 3.3 | 24.4 |
| 71 | 1.2 | ST/2.9 | hexane | r.t | 1 | 3.8 | 36.8 |
| 72 | 1.2 | ST/5.9 | hexane | r.t | 1 | 6.8 | 54.7 |
| 73 | 1.0 | MMA/3.7 | THF | 0 | 1.5 | 1.86 | 20.0 |
| 74 | 1.0 | MMA/3.4 | THF | 0 | 15 | 2.66 | 31.8 |
| 75 | 0.5 | MMA/2.5 | THF | r.t. | 5 | 0.95 | 20.1 |
| 76 | 0.8 | MMA/4.0 | hexane | r.t. | 5 | 3.08 | 44.4 |
| 77 | 0.8 | MMA/4.0 | hexane | 0 | 5 | 2.21 | 33.0 |
| 78 | 1.2 | AN/3.0 | THF | r.t. | 1 | 1.60 | 15.0 |
| 79 | 0.55 | AN/1.75 | THF | r.t. | 16 | 1.04 | 32.0 |
| 80 | 1.0 | AN/3.0 | hexane | r.t. | 16 | 2.99 | 51.2 |
| 81 | 1.0 | p-ms/4.0 | hexane | r.t. | 0.5 | 5.0 | 48.7 |

ST: styrene, MMA: methyl methacrylate, AN: acrylonitrile, p-ms: p-methylstyrene

TABLE 9

A summary of the preparation of PE-g-PCL graft copolymers

| example | PE-OAlEt$_2$ g | e-CL g | reaction time hr. | PE-g-PCL g | caprolactone in graft copolymer mole % |
|---|---|---|---|---|---|
| 82 | 1.0 | 6.0 | 3.0 | 1.2 | 5.7 |
| 83 | 1.0 | 3.0 | 17 | 2.8 | 35.6 |
| 84 | 1.0 | 6.0 | 17 | 5.1 | 55.0 |

*toluene as solvent, room temperature

TABLE 10

A summary of the anionic graft-from polymerization reactions** by using lithiated poly(propylene-co-p-methylstyrene) as initiator

| example | lithiated PP g | comonomer* g | time hrs | graft copolymer g | comonomer in graft mol % |
|---|---|---|---|---|---|
| 85 | 1.5 | ST/2.3 | 1.0 | 2.5 | 21.9 |
| 86 | 1.2 | ST/4.5 | 1.0 | 3.5 | 35.3 |
| 87 | 1.0 | ST/3.0 | 2.3 | 3.9 | 43.0 |
| 88 | 1.0 | MMA/4.0 | 16 | 1.7 | 23.0 |
| 89 | 0.7 | MMA/5.4 | 18 | 2.2 | 38.5 |
| 90 | 1.0 | AN/3.0 | 18 | 2.3 | 50.0 |
| 91 | 1.0 | pms/3.05 | 0.5 | 1.4 | 12.2 |
| 92 | 1.0 | pms/3.05 | 1.0 | 1.7 | 20.6 |
| 93 | 1.0 | pms/3.05 | 2.0 | 2.8 | 39.0 |
| 94 | 1.0 | pms/3.05 | 4.0 | 4.0 | 51.8 |
| 95 | 2.0 | pms/4.10 | 4.0 | 6.1 | 41.9 |

*ST: styrene, MMA: methyl methacrylate, AN: acrylonitrile, p-ms: p-methylstyrene
**cyclohexane as solvent, room temperature.

TABLE 11

A summary of the preparation of PP-g-polybutadiene graft copolymers

| Example | lithiated PP g | *DPDE/Li mol/mol | solvent | BD** ml | graft copolymer g | BD in graft mole % | structure of PBD** 1,2- mole % | 1,4- mole % |
|---|---|---|---|---|---|---|---|---|
| 96 | 1.0 | 0 | hexane | 7 | 5.0 | 75.8 | 79.4 | 20.6 |
| 97 | 1.0 | 5 | hexane | 4 | 3.2 | 63.1 | 87.2 | 12.8 |
| 98 | 1.0 | 10 | hexane | 8 | 5.9 | 79.1 | 91.9 | 8.1 |
| 99 | 3.1 | 10 | hexane | 8 | 8.1 | 55.4 | 90.2 | 9.8 |
| 100 | 1.0 | 10 | THF | 6 | 1.1 | — | — | |
| 101 | 1.2 | 0 | hexane | 5 | 4.0 | 64.4 | 82.0 | 18.0 |
| 102 | 2.2 | 10 | hexane | 7 | 4.7 | 46.9 | 98.3 | 1.7 |

*External base: 1,2-dipiperidinoethane
**BD: butadiene, PBD: polybutadiene

EXAMPLE 103

Synthesis of EP-g-polystyrene Graft Copolymers

In an argon filled dry box, 5 g of poly(ethylene-ter-propylene-ter-p-methylstyrene), containing 95 mol % of ethylene, 4.5 mole % of propylene and 0.5 mole % of p-methylstyrene, was lithiated by mixing with 6.5 ml of 1.3 M sec-BuLi and 2.8 ml TMEDA in 150 ml cyclohexane. The lithiation took place at 65° C. for 4 hrs. The resulting polymer was filtered and washed repeatly with hexane. The lithiated EP polymer was then suspended in THF solvent, and a graft-from reaction was carried out in slurry solution by reacting the lithiated polymer with styrene monomer (7 ml) at room temperature. After 1 hour, 10 ml of isopropanol was added to terminate the graft-from reaction. The precipitated polymer was filtered and then subjected to fractionation. THF was used to remove polystyrene homopolymer. The major insoluble fraction was EP-g-polystyrene copolymer (9.5 g), which was completely soluble in trichlorobenzene at elevated temperatures. The composition of graft copolymer was determined by $^1$H NMR spectrum which shows about 22 mole % styrene content.

EXAMPLE 104

Synthesis of EP-g-polyacrylonitrile Graft Copolymers

In an argon filled dry box, 5 g of poly(ethylene-ter-propylene-ter-p-methylstyrene), containing 95 mol % of ethylene, 4.5 mole % of propylene and 0.5 mole % of p-methylstyrene, waslithiated by the procedure described in Example 103. The lithiated EP copolymer was then suspended in THF solvent. The graft-from reactions was carried out at 0° C. by adding 10 ml of acrylonitrile. After reacting for 1 hour, 10 ml of isopropanol was added to terminate the graft-from reaction. The precipitated polymer was filtered and then subjected to Soxhlet fractionation. Dimethylformamide was used to remove polyacrylonitrile homopolymer. The major insoluble fraction was EP-g-polyacrylonitrile copolymer (8.4 g).

EXAMPLE 105

Synthesis of EP-g-polystyrene Graft Copolymer

In an argon filled dry box, 2.5 g of poly(ethylene-ter-propylene-ter-p-methylstyrene), containing 4 mol % of ethylene, 95 mole % of propylene and 1 mol % of p-methylstyrene, was lithiated by mixing with 3 ml of 1.3 M sec-BuLi and 1.4 ml TMEDA in 100 ml cyclohexane. The lithiation took place at 65° C. for 4 hrs. The resulting polymer was filtered and washed repeatly with hexane. The lithiated EP polymer was then suspended in hexane solvent, and a graft-from reaction was carried out in slurry solution by reacting the lithiated polymer with styrene monomer (5 ml) at room temperature. After 1 hour, 10 ml of isopropanol was added to terminate the graft-from reaction. The precipitated polymer was filtered and then subjected to fracitonation. THF was used to remove polystyrene homopolymer. The major insoluble fraction was EP-g-polystyrene copolymer (6.4 g), which was completely soluble in trichlorobenzene at elevated temperatures. By $^1$H NMR spectrum analysis it was determined that the graft copolymer contained bout 30 mole % styrene.

EXAMPLE 106

Synthesis of EP-g-polyacrylonitrile Graft Copolymer

In an argon filled dry box, 2.5 g of poly(ethylene-ter-propylene-ter-p-methylstyrene), containing 4 mol % of ethylene, 95 mole % of propylene and 1 mole % of p-methylstyrene, was lithiated by the procedure described in Example 105. The lithiated EP copolymer was then suspended in THF solvent. A graft-from reaction was carried out at 0° C. by adding 8 ml of acrylonitrile. After reacting for 1 hour, 10 ml of isopropanol was added to terminate the graft-from reaction. The precipitated polymer was filtered and then subjected to Soxhlet fractionation by using dimethylformamide to remove polyacrylonitrile homopolymer. The major insoluble fraction was EP-g-polyacrylonitrile copolymer (6.5 g).

EXAMPLES 107

In Situ Formation of PP-g-PA 11 in Polymer Melt

Polymer melt blending was carried out in a Brabender mixer (PL2000 Plasti-Corder) under nitrogen atmosphere, at 210° C., 50 rpm for 30 min. Two polymer blends were prepared by mixing 30 g of PP and 10 g of dried PA-11 (Nylon-11) with and without 2 g of maleic anhydride modified PP (PP-MA for Example 47). Scanning electron microscopy (SEM) was used to view the morphology of polymer blends. For the simple PP/PA11 blend, a clear phase separation with many void domains was observed. This indicated poor adhesion between the matrix PP and dispersed phase PA-11. On the other hand, a fairly uniform morphology was observed for the PP/PP-MA/PA11 sample. Fine and uniform PA11 particles were embedded in the PP matrix. The addition of small amount of PP-MA in PP/PA11 blends greatly improved the phase dispersion of PA-11 in the PP matrix and their interfacial adhesion. Both effects clearly were due to the in-situ formation of graft copolymers of PP-g-PA11, which serves as the interfacial agent in the polymer blend.

What is claimed is:

1. A functionalized terpolymer of two different α-olefins having form 2to 12 carbon atoms and para-alkylstyrene, said functionalized terpolymer having a substantially homogeneous compositional distribution represented by the formula:

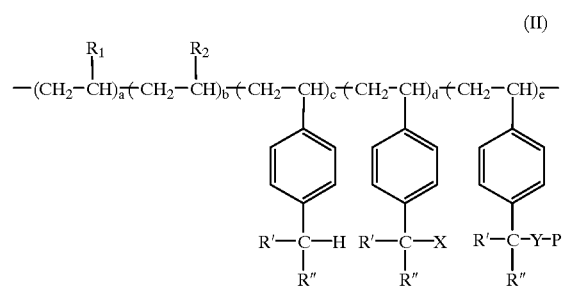

(II)

in which $R_1$, $R_2$, R' and R", independently, are hydrogen or $C_1$ to $C_{10}$ linear or branched alkyl group, with the proviso that $R_1$ is not the same as $R_2$; X is a functional group; P is a polymer having a molecular weight of at least 500, which can be derived from both step and chain polymerization reactions; Y is a chemical linkage between polymer P and para-alkylstyrene side chain, which is also a residue derived from a graft reaction; and the combination of a+b+c+d+e represents the empirical formula of a substantially random functional polymer; where both a and b are greater than 0, where the sum of a+b ranges from about 50 to 100,000; where each of c, d and e range from 0 to 10,000; where both d and e can not be 0, and where the sum of c+d+e is at least 1; and wherein said functionalized terpolymer has been derived from an initial terpolymer having a substantially homogeneous compositional distribution and having been prepared in the presence of a transition metal coordination catalyst, said initial terpolymer being represented by the formula

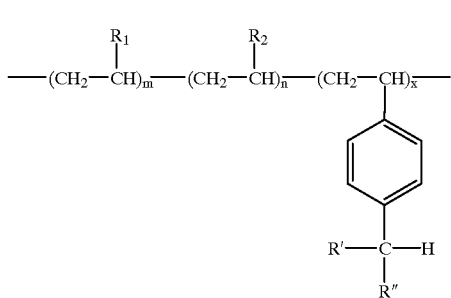

(I)

where $R_1$, $R_2$, R' and R" are defined above; where the combined α-olefin mole % (m+n) is between about 5 and 99.9; where the sum of m+n+x (mole % of p-alkylstyrene, is 100; and where the initial terpolymer has a number average molecular weight (Mn) of at least 1,000 and a ration of weight average molecular weight (Mw) to number average molecular weight of less than 8.

2. The functionalized terpolymer of claim 1, hwerein $R_1$ is hydrogen and $R_2$ is $C_1$ to $C_{10}$ linear or branched alkyl; R' and R", independently, are hydrogen or $C_1$ to $C_6$ linear or branched alkyl; X is selected from the group consisting of —COOH, —OH, —SH, —NH$_2$, —Cl, —Br, —M (where M=a metal ion), —COOM and anhydrides; and Y is a simple chemical bond or the residue of a functional group.

3. The functionalized terpolymer of claim 2, wherein $R_1$ is hydrogen and $R_2$ is $C_1$ to $C_6$ linear or branched alkyl; R' and R" are hydrogen; and Y is a simple chemical bond or the residue of a functional group selected from the group consisting of ether, ester, amide and imide groups.

4. The functionalized terpolymer of claim 2, wherein (e) is 0 and (d) is at least 1.

5. The functionalized terpolymer of claim 2, wherein (d) is 0 and (e) is at least 1.

6. The functionalized terpolymer of claim 3, wherein (e) is 0 and (d) is at least 1.

7. The functionalized terpolymer of claim 3, wherein (d) is 0 and (e) is at least 1.

8. The functionalized terpolymer of claim 2, wherein X is selected from chlorine and bromine.

9. The functionalized terpolymer of claim 3, wherein X is selected from chlorine and bromine.

10. The functionalized terpolymer of claim 4, wherein X is selected from chlorine and bromine.

11. The functionalized terpolymer of claim 2, wherein X is selected from hydroxy and amino groups.

12. The functionalized terpolymer of claim 3, wherein X is selected from hydroxy and amino groups.

13. The functionalized terpolymer of claim 4, wherein X is selected from hydroxy and amino groups.

14. The functionalized terpolymer of claim 2, wherein X is selected from carboxylic acid, succinic acid anhydride and metal salts of carboxylic acid.

15. The functionalized terpolymer of claim 3, wherein X is selected from carboxylic acid, succinic anhydride and metal salts of carboxylic acid.

16. The functionalized terpolymer of claim 4, wherein X is selected from carboxylic acid, succinic anhydride and metal salts of carboxylic acid.

17. The functionalized terpolymer of claim 1, wherein Y is a residue derived from a graft reaction and is a single bond between the terpolymer of α-olefin and p-alkylstyrene and the side chain polymer P; and wherein P is selected from the group consisting of polymers and copolymers of anionically polymerizable monomers.

18. The functionalized terpolymer of claim 2, wherein Y is a residue derived from a graft reaction and is a single bond between the terpolymer of α-olefin and p-alkylstyrene and the side chain polymer P; and wherein P is selected from the group consisting of polymers and copolymers of anionically polymerizable monomers.

19. The functionalized terpolymer of claim 3, wherein y is a residue derived from a graft reaction and is a single bond between the terpolymer of α-olefin and p-alkylstyrene and the side chain polymer P; and wherein P is selected form the group consisting of polymers and copolymers of anionically polymerizable monomers.

20. The functionalized terpolymer of claim 17, wherein said anionically polymerizable monomers are selected from the group consisting of vinyl aromatic compounds, butadiene, isoprene, alkyl acrylates, alkyl methacrylates, vinyl unsaturated amides, methacrylonitrile, acrylonitrile, vinyl pyridines, and mixtures thereof.

21. The functionalized terpolymer of claim 1, wherein Y is selected from the group consisting of —O— and —S—; and wherein P is selected from the group consisting of polymers and copolymers of free radically polymerizable monomers.

22. The functionalized terpolymers of claim 21, wherein said free radically polymerizable monomers are selected from the group consisting of ethylene, vinyl aromatic compounds, acrylates, methacrylates, vinyl acetate, acrylamides, methacrylamides, acrylonitrile, methacrylonitrile and mixtures thereof.

23. The functionalized terpolymer of claim 1, wherein Y is a linked nucleophilic residue and P is selected from the group consisting of polymers and copolymers of anionically polymerizable monomers, anionically and cationically ring-openable monomers and oxidatively coupleable monomers.

24. The functionalized terpolymer of claim 23, wherein said anionically and cationically ring-openable monomers are selected from the group consisting of cyclic ethers, sulfides, lactones, lactams and n-carboxyanhydrides.

25. The functionalized terpolymer of claim 1, wherein Y is selected from the group consisting of

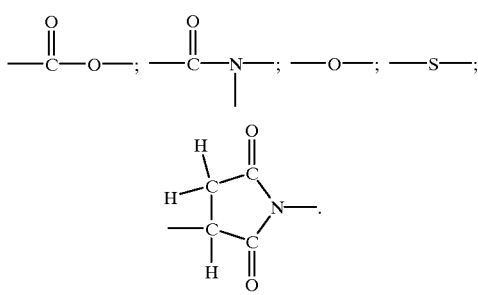

* * * * *